United States Patent
Shimizu

(10) Patent No.: US 11,709,628 B2
(45) Date of Patent: Jul. 25, 2023

(54) FILE STORAGE AND COMPUTER SYSTEM THAT CREATES NEW CHUNKS AFTER AN UPDATE

(71) Applicant: Hitachi, Ltd., Tokyo (JP)

(72) Inventor: Tomoki Shimizu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 243 days.

(21) Appl. No.: 17/208,068

(22) Filed: Mar. 22, 2021

(65) Prior Publication Data
US 2022/0137878 A1  May 5, 2022

(30) Foreign Application Priority Data

Nov. 5, 2020 (JP) ................................. 2020-185166

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0644* (2013.01)

(58) Field of Classification Search
CPC .... G06F 3/0659; G06F 3/0604; G06F 3/0644; G06F 3/067; G06F 3/061; G06F 3/0643
See application file for complete search history.

(56) References Cited

U.S. PATENT DOCUMENTS

| | | | | |
|---|---|---|---|---|
| 6,678,828 B1 * | 1/2004 | Pham | .................. | H04L 67/1097 726/4 |
| 8,868,647 B2 * | 10/2014 | Naga | ........................ | G06F 16/13 709/217 |
| 2008/0063191 A1 * | 3/2008 | Hatano | .................. | H04L 9/0833 380/45 |
| 2009/0300351 A1 * | 12/2009 | Lei | ......................... | G06F 16/986 707/999.005 |
| 2012/0060072 A1 * | 3/2012 | Simitci | ............... | H03M 13/373 714/752 |

(Continued)

FOREIGN PATENT DOCUMENTS

WO     2018/154698 A1    8/2018

OTHER PUBLICATIONS

Boyuka, David A., et al. "Transparent in situ data transformations in adios." 2014 14th IEEE/ACM International Symposium on Cluster, Cloud and Grid Computing. IEEE, 2014. (Year: 2014).*

*Primary Examiner* — Ramon A. Mercado
(74) *Attorney, Agent, or Firm* — Mattingly & Malur, PC

(57) ABSTRACT

In file storage, a CPU is configured to: divide a file into a plurality of chunks, execute encoding processing on at least one of the chunks to obtain an encoded chunk, and store in cloud storage a plurality of chunks of the file including the encoded chunk; acquire, when receiving a read command of which target is data of a part of a file stored in the cloud storage, a read target chunk including data, which is a target of the read command, from the cloud storage; and execute, when an encoded chunk is included in the read target chunk, decoding processing on the encoded chunk, identify data that is a read target from the read target chunk including the chunk having been subjected to decoding processing, and hand over the identified data to a command source of the read command.

11 Claims, 18 Drawing Sheets

(56) References Cited

U.S. PATENT DOCUMENTS

| | | | | |
|---|---|---|---|---|
| 2012/0102005 | A1* | 4/2012 | Kamei | G06F 3/064 |
| | | | | 707/693 |
| 2015/0356109 | A1* | 12/2015 | Arikawa | G06F 11/00 |
| | | | | 707/692 |
| 2016/0006461 | A1* | 1/2016 | Yin | G06F 16/182 |
| | | | | 714/766 |
| 2016/0259591 | A1* | 9/2016 | Arikawa | G06F 3/0608 |
| 2017/0048021 | A1* | 2/2017 | Yanovsky | H04L 63/1458 |
| 2017/0102898 | A1* | 4/2017 | Shimizu | G06F 3/0604 |
| 2017/0372078 | A1* | 12/2017 | Lewis | G06F 21/6218 |
| 2018/0075047 | A1* | 3/2018 | Wozniak | G06F 11/1092 |
| 2018/0145791 | A1* | 5/2018 | Martin | H03M 7/6023 |
| 2019/0065310 | A1* | 2/2019 | Rozas | H03M 13/23 |
| 2019/0188079 | A1* | 6/2019 | Kohli | G06F 11/1076 |
| 2019/0215358 | A1* | 7/2019 | Kobayashi | H04L 67/06 |
| 2020/0042444 | A1* | 2/2020 | Kang | H04L 67/1097 |
| 2021/0034237 | A1* | 2/2021 | Cerny | G06F 3/064 |
| 2022/0137878 | A1* | 5/2022 | Shimizu | G06F 3/0659 |
| | | | | 711/154 |
| 2022/0138352 | A1* | 5/2022 | Shachar | G06F 3/0659 |
| | | | | 713/193 |

* cited by examiner 257A (257)

| Non-processing start offset | Non-processing end offset (non-processed chunk size) | | Chunk file identifier | Chunk file size | Processing contents | Chunk hash value |
|---|---|---|---|---|---|---|
| 2571 | 2572 | | 2573 | 2574 | 2575 | 2576 |
| 0 | 100KB | (100KB) | /file/a | 50KB | A compression | 000 |
| 100KB | 150KB | (50KB) | /file/b | 25KB | A compression | 111 |
| 150KB | 300KB | (150KB) | /file/c | 150KB | Non-processed | AAA |
| 300KB | 400KB | (100KB) | /file/d | 120KB | B encryption | BBB |
| ⋮ | ⋮ | | ⋮ | ⋮ | ⋮ | ⋮ |

FIG. 5

|  |  |  |  |  |  |  |  | 257B (257) |
|---|---|---|---|---|---|---|---|---|

| 2571 | 2572 | | 2591 | 2592 | | 2575 | 2576 |
|---|---|---|---|---|---|---|---|
| Non-processing start offset | Non-processing end offset | (non-processed chunk size) | Post-processing start offset | Post-processing end offset | (post-processing chunk size) | Processing contents | Chunk hash value |
| 0 | 100KB | (100KB) | 0 | 50KB | (50KB) | A compression | 000 |
| 100KB | 150KB | (50KB) | 50KB | 75KB | (25KB) | A compression | 111 |
| 150KB | 300KB | (150KB) | 75KB | 150KB | (75KB) | A compression | CCC |
| 300KB | 400KB | (100KB) | 150KB | 200KB | (50KB) | A compression | DDD |
| ⋮ | ⋮ | | ⋮ | ⋮ | | ⋮ | ⋮ |

FIG. 6

| File identifier of file | File identifier of chunk map | Storage state |
|---|---|---|
| /file1 | /file1/map | Divided |
| /file3 | /file3/map | Divided |
| /file5 | /file5/map | Coupled |
| ⋮ | ⋮ | ⋮ |

FIG. 7

FILE STORAGE AND COMPUTER SYSTEM THAT CREATES NEW CHUNKS AFTER AN UPDATE

CROSS-REFERENCE TO PRIOR APPLICATION

This application relates to and claims the benefit of priority from Japanese Patent Application No. 2020-185166 filed on Nov. 5, 2020, the entire disclosure of which is incorporated herein by reference.

BACKGROUND

The present disclosure relates to a file storage or the like that manages a file and to a technique for storing a managed file to a data storage and utilizing the managed file.

It is common practice to store, in cloud storage (an example of a data storage) that is coupled via a network, data in files managed in a file storage, for applications such as remote backup, migration, file virtualization, and data aggregation. In this case, for example, the file storage stores, in the cloud storage, data in file units.

When storing data in cloud storage and utilizing the data, there are requests for suppressing costs of communication between the file storage and the cloud storage and suppressing time required for the communication. Therefore, it is important to reduce a data amount to be transferred between the file storage and the cloud storage. In particular, since a WAN (Wide Area Network) is used as a network between the cloud storage and the file storage, and the WAN generally has a narrow communication bandwidth, reducing a data mount is important.

In consideration thereof, it is common practice to reduce a data amount during a file update by dividing the file into a plurality of parts and transferring a part that includes a portion having been updated upon the update of the file to cloud storage.

For example, WO 2018/154698 discloses a technique in which in a case where a file is divided into parts and then transferred, and when a transferred part is updated, efficient data re-transferring can be implemented.

In addition, as a technique for reducing a data amount to be transferred, a technique for reducing a data amount by compressing data of a file is known.

Furthermore, a technique for encrypting data in a file and storing the encrypted data in cloud storage in order to prevent data leakage from the cloud storage is known.

SUMMARY

For example, when a file having been encoded by compression, encryption, or the like is stored in cloud storage and data in a part of the file is required by a file storage side, the necessary data has to be acquired by reading the entire file to the file storage side and by decoding (by expansion and/or decryption) the read file, or the file has to be decoded at the cloud storage side and necessary data has to be acquired from the decoded file, and then the necessary data has to be transmitted to the file storage. For example, in the case of the former, since an entire file has to be transferred, there is a problem in that a data amount of communication is large. On the other hand, when decoding is to be performed at the cloud storage side, there is a problem in that the cloud storage side has to be equipped with a decoding function and that the cloud storage side has to bear a load, time, and the like required by the decoding processing. Furthermore, in a case of managing a file having been encrypted at the cloud storage side, there is a problem in that, when decryption processing is enabled to be performed at the cloud storage side, this increases a risk of data leakage from the cloud storage side.

In consideration thereof, the technique described in WO 2018/154698 cannot be used without modification for an encoded file. For example, when a part of a file is updated, since the part cannot be identified when the file has been encoded or the file has to be decoded, the technique described in WO 2018/154698 cannot be used without modification.

The present disclosure has been made in consideration of the circumstances described above, and an object thereof is to provide a technique that enables encoding to be performed on data in a file and enables efficient data communication between a file storage and a data storage.

In order to achieve the object described above, the file storage according to an aspect is a file storage which is coupled to a data storage configured to store date, and which manages a file, the file storage including a processor, wherein the processor is configured to: divide the file into a plurality of chunks, execute encoding processing on at least one of the chunks to obtain an encoded chunk, and store in the data storage the plurality of chunks of the file including the encoded chunk in the data storage; acquire, when receiving a read command of which target is data of a part of a file stored in the data storage, a read target chunk including data, which is a target of the read command, from the data storage; and execute, when an encoded chunk is included in the read target chunk, decoding processing on the encoded chunk, identify data, which is a read target, from the read target chunk including a chunk having been decoded in the decoding processing, and hand over the identified data to a command source of the read command.

According to the present disclosure, encoding can be performed on data in a file and efficient data communication between the file storage and the data storage can be implemented. Objects, configurations, and effects other than those described above will become apparent from the following detailed description of the embodiment.

BRIEF DESCRIPTION OF THE DRAWINGS

FIG. 5 is a configuration diagram of a chunk map for chunk individual storage according to the embodiment;

FIG. 6 is a configuration diagram of a chunk map for chunk coupled storage according to the embodiment;

FIG. 7 is a configuration diagram of a chunk map map according to the embodiment;

DETAILED DESCRIPTION OF THE EMBODIMENT

An embodiment will be described with reference to the drawings. It should be noted that the embodiment described below is not intended to limit the invention as set forth in the accompanying claims and that all of the elements described in the embodiment and combinations thereof are not necessarily essential to solutions proposed by the invention.

Although information will be described below using expressions such as an "AAA table", information may be expressed using any kind of data structure. In other words, an "AAA table" can also be referred to as "AAA information" in order to demonstrate that information is not dependent on data structure.

In addition, while a "program" is sometimes used as an operating entity when describing processing in the following description, since a program causes predetermined processing to be performed while using at least one of a storage unit and an interface unit as appropriate by being executed by the processor, the processor (or a computer or a computer system including the processor) may be used as a subject of processing. The program may be installed to a computer from a program source. The program source may be, for example, a program distribution server or a storage medium (for example, a portable storage medium) that is readable by a computer. In addition, in the following description, two or more programs may be realized as one program or one program may be realized as two or more programs. Furthermore, at least a part of processing that is realized by executing the program may be realized by a hardware circuit (for example, an ASIC (Application Specific Integrated Circuit) or an FPGA (Field-Programmable Gate Array)).

Figure 1:
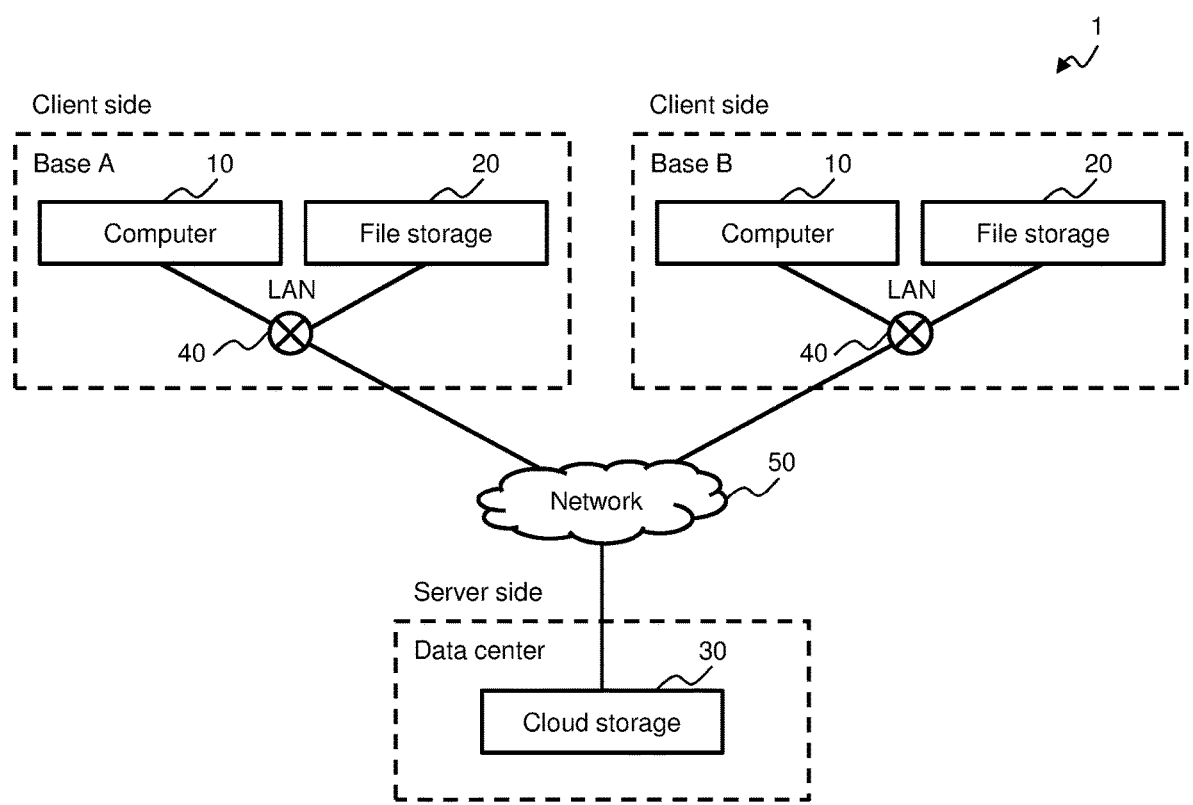
FIG. 1 is an overall configuration diagram of a computer system according to an embodiment.

FIG. 1 is an overall configuration diagram of a computer system according to an embodiment.

A computer system 1 includes one or more computers 10, one or more file storages 20, and a cloud storage 30 as an example of the data storage.

The computer 10 and the file storage 20 are provided at, for example, bases (a base A, a base B, and the like) of a client and are coupled via a LAN (Local Area Network) 40 at the bases.

The computer 10 is an apparatus used by a user to execute various kinds of processing using files managed by the file storage 20. The file storage 20 has a file system for managing files to be used by the computer 10.

The cloud storage 30 is provided at, for example, a data center as a server side and is coupled to a network 50. The network 50 is, for example, a WAN (Wide Area Network) and is coupled to the LAN 40 at each base.

The cloud storage 30 is an example of the data storage and stores data of at least a part of a plurality of files being managed by the file storage 20.

Next, a configuration of the file storage 20 will be described in detail.

Figure 2:
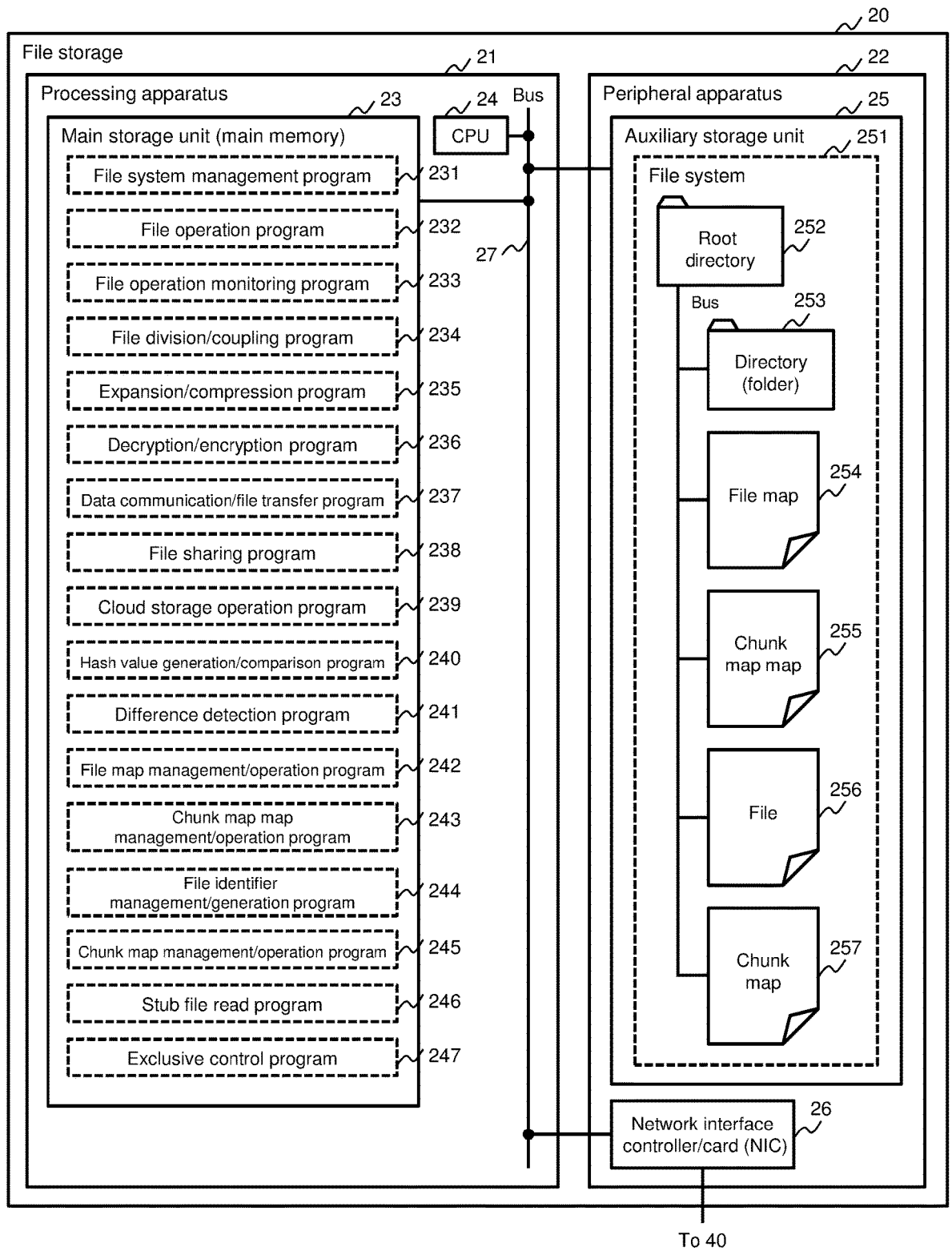
FIG. 2 is a configuration diagram of a file storage according to the embodiment.

FIG. 2 is a configuration diagram of the file storage according to the embodiment.

The file storage 20 is constituted by, for example, a PC (Personal Computer), a main frame, a server, or the like and has a processing apparatus 21 and a peripheral apparatus 22. The processing apparatus 21 has a main storage unit (a main memory) 23 and a central processing unit (a CPU) 24 as an example of a processor.

The CPU 24 executes various kinds of processing in accordance with programs stored in the main storage unit 23.

The main storage unit 23 is, for example, a RAM (Random Access Memory) and stores programs to be executed by the CPU 24 and necessary information. The main storage unit 23 includes a file system management program 231, a file operation program 232, a file operation monitoring program 233, a file division/coupling program 234, an expansion/compression program 235, a decryption/encryption program 236, a data communication/file transfer program 237, a file sharing program 238, a cloud storage operation program 239, a hash value generation/comparison program 240, a difference detection program 241, a file map management program 242, a chunk map map management/operation program 243, a file identifier management/generation program 244, a chunk map management/operation program 245, a stub file read program 246, and an exclusive control program 247.

The file system management program 231 manages a file system that manages files. The file operation program 232 executes operations (create, read, update, delete, and the like) with respect to a file. The file operation monitoring program 233 monitors operations with respect to a file. The file division/coupling program 234 divides a file into chunks and couples chunks. The expansion/compression program 235 executes expansion processing and compression processing with respect to data. The decryption/encryption program 236 executes decryption processing of encrypted data and encryption processing of data. The data communication/file transfer program 237 executes data communication via the network 50 and transfer processing of a file. The file sharing program 238 performs processing related to file sharing between file storages 20 at a plurality of bases. The cloud storage operation program 239 executes processing for operating the cloud storage 30 such as processing for issuing various commands to the cloud storage 30. The hash value generation/comparison program 240 performs generation processing of a hash value with respect to data and comparison processing of hash values. The difference detection program 241 detects a difference between pieces of data. The file map management/generation program 242 manages a correspondence between a local file in the file storage 20 and data (an object or a file) in the cloud storage 30. The chunk map map management/operation program 243 performs processing for managing a chunk map map 255 to be described later. The file identifier generation/management program 244 performs processing for generating and managing a file identifier for identifying a file in the cloud storage 30. The chunk map management/operation program 245 executes operations (create, read, update, delete, and the like) with respect to a chunk map 257 (257A and 257B) to be described later. The stub file read program 246 executes processing for reading a body of a stubbed file (a stub file) from the cloud storage 30. The exclusive control program 247 performs exclusive control when accessing a file.

The peripheral apparatus 22 has an auxiliary storage unit 25 as an example of the storage unit and a NIC (Network interface controller/card) 26. The main storage unit 23, the CPU 24, the auxiliary storage unit 25, and the network card 26 are coupled via a bus 27.

The auxiliary storage unit 25 is, for example, a non-volatile storage apparatus such as an HDD (Hard Disk Drive), a flash memory, or block storage and stores programs to be executed by the CPU 24 and various pieces of data to be used by the CPU 24. In the present embodiment, the auxiliary storage unit 25 stores information for configuring a file system 251.

The file system 251 stores a root directory 252, one or more directories 253, a file map 254, a chunk map map 255, a file 256, and a chunk map 257 as an example of encoding processing information.

The root directory 252 is information of a directory that acts as a root of the file system and stores information on directories and files contained in the root directory. The directory 253 stores information on directories and files contained in itself.

The file map 254 stores a correspondence between identification information (directory information) of a local file being managed by the file storage 20 and identification information (a file identifier: strictly speaking, for example, an object identifier when the cloud storage 30 is object storage and a file identifier when the cloud storage 30 is file storage) that enables the file to be identified in the cloud storage 30.

The chunk map map 255 is a table for managing a correspondence between a file identifier of a file in the cloud storage 30 and an identifier of a file (a chunk map file) of the chunk map 257 of the file. The chunk map map 255 will be described later with reference to FIG. 7. The file 256 is a file to be managed by the file system 251. The chunk map 257 is a table for managing an offset (positional information in a file) and the like of a chunk created by dividing the file. Examples of the chunk map 257 include a chunk map 257A for chunk individual storage that is used when individually (independently) storing a chunk in the cloud storage 30 and a chunk map 257B for chunk coupled storage that is used when chunks are stored in the cloud storage 30 after being coupled. The chunk map 257 (257A and 257B) will be described later with reference to FIGS. 5 and 6.

Next, a configuration of the cloud storage 30 will be described in detail.

Figure 3:
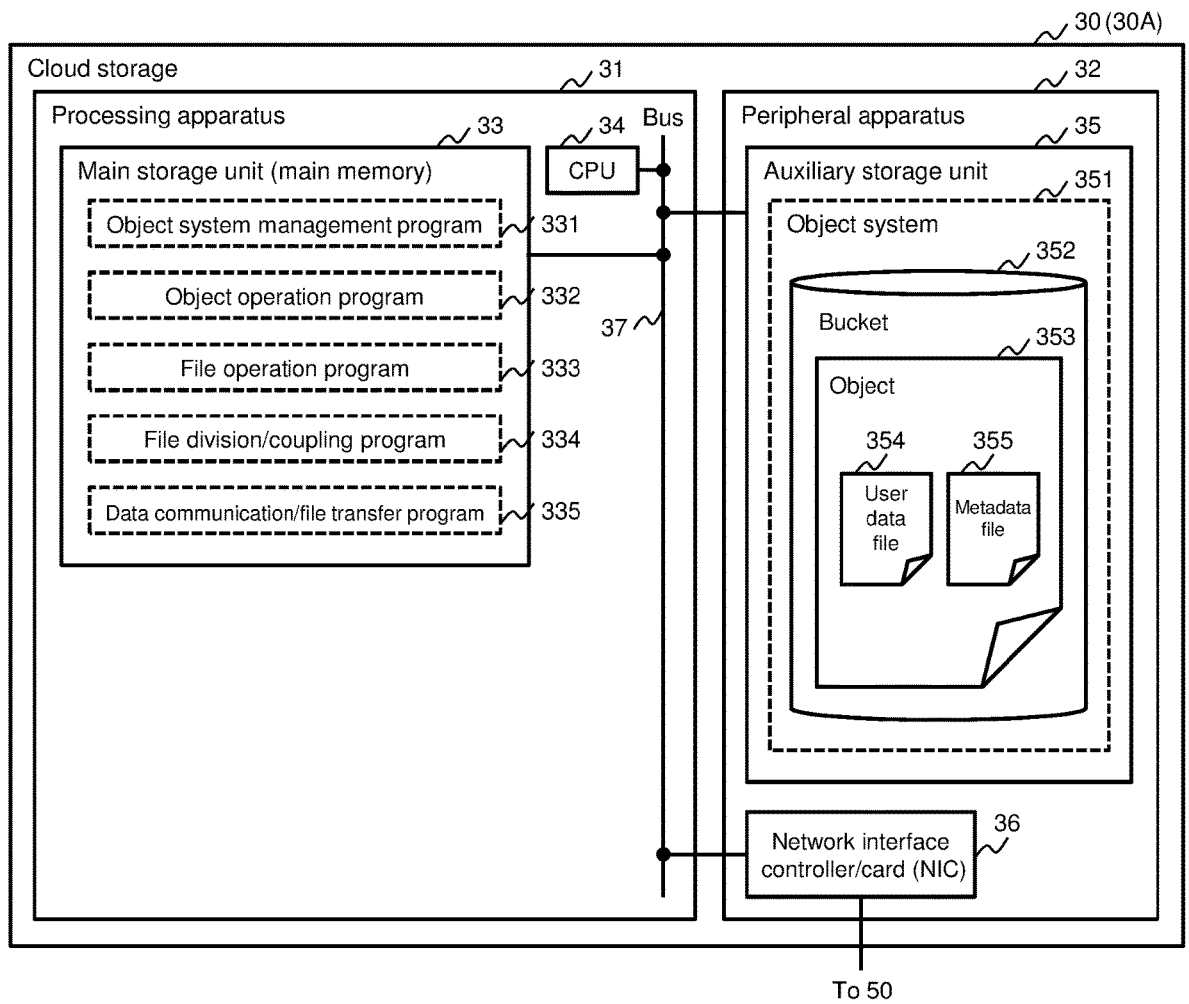
FIG. 3 is a first configuration diagram of a cloud storage according to the embodiment.

FIG. 3 is a first configuration diagram of the cloud storage according to the embodiment. The cloud storage 30 shown in FIG. 3 represents a configuration diagram when used as an object storage that manages data as an object.

The cloud storage 30 is constituted by, for example, a PC, a main frame, a server, or the like and has a processing apparatus 31 and a peripheral apparatus 32. The processing apparatus 31 has a main storage unit (a main memory) 33 and a CPU 34 as an example of the processor.

The CPU 34 executes various kinds of processing in accordance with programs stored in the main storage unit 33.

The main storage unit 33 is, for example, a RAM and stores programs to be executed by the CPU 34 and necessary information. The main storage unit 33 includes an object system management program 331, an object operation program 332, a file operation program 333, a file division/coupling program 334, and a data communication/file transfer program 335.

The object system management program 331 manages an object system that manages objects. The object operation program 332 executes operations (write, read, delete, and the like) with respect to an object. The file operation program 333 executes operations (write, read, delete, and the like) with respect to a file included in an object. The file division/coupling program 334 divides a file into chunks and couples chunks. The data communication/file transfer program 335 executes data communication via the network 50 and transfer processing of a file.

The peripheral apparatus 32 includes an auxiliary storage unit 35 and a NIC 36. The main storage unit 33, the CPU 34, the auxiliary storage unit 35, and the network card 36 are coupled via a bus 37.

The auxiliary storage unit 35 is, for example, a non-volatile storage unit such as an HDD, a flash memory, or block storage and stores programs to be executed by the CPU 34, various pieces of data to be used by the CPU 34, and information (including objects) for configuring an object system 351.

The object system 351 stores a bucket 352. The bucket 352 stores one or more objects 353. The object 353 includes a user data file 354 and a metadata file 355. The user data file 354 is a file being managed by the file storage 20 or a file of a chunk of the managed file. The metadata file 355 represents metadata in the object system 351 regarding the user data file 354.

Figure 4:
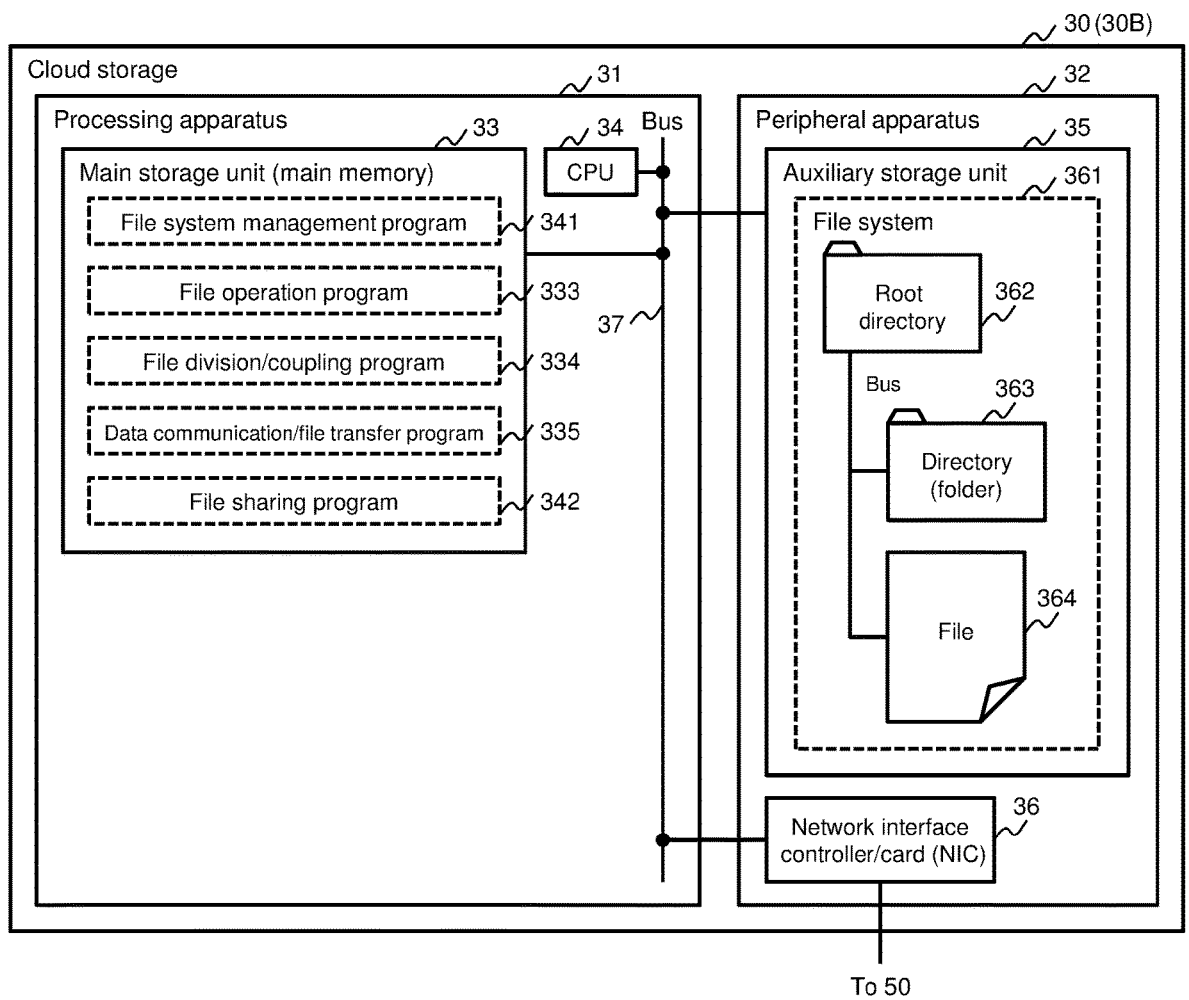
FIG. 4 is a second configuration diagram of a cloud storage according to the embodiment.

FIG. 4 is a second configuration diagram of a cloud storage according to the embodiment. The cloud storage 30 shown in FIG. 4 represents a configuration diagram when used as a file storage that manages data as a file. It should be noted that portions similar to the configuration shown in FIG. 3 will be denoted by same symbols and redundant descriptions may be omitted.

The main storage unit 33 includes a file system management program 341, a file operation program 333, a file division/coupling program 334, a data communication/file transfer program 335, and a file sharing program 342.

The file system management program 341 manages a file system that manages files. The file sharing program 342 performs processing related to file sharing between file storages 20 at a plurality of bases.

Next, the chunk map 257A for chunk individual storage will be described.

FIG. 5 is a configuration diagram of a chunk map for chunk individual storage according to the embodiment.

The chunk map 257A for chunk individual storage is a chunk map in a case where a chunk is individually stored in the cloud storage 30 as a file (an object when the cloud storage 30 is object storage). The chunk map 257A is provided in correspondence to each file in the file storage 20. The chunk map 257A has an entry for each chunk of a file corresponding to the chunk map 257A. An entry of the chunk map 257A includes fields of a non-processing start offset 2571, a non-processing end offset (non-processed chunk size) 2572, a chunk file identifier 2573, a chunk file size 2574, processing contents 2575, and a chunk hash value 2576. It should be noted that the non-processing end offset (non-processed chunk size) 2572, the chunk file size 2574, and the chunk hash value 2576 are not essential fields for operation.

The non-processing start offset 2571 stores a start position (a start offset) of a chunk from the top of a non-processed file of a chunk corresponding to the entry. In this case, "non-processed" refers to a state where encoding such as compression or encryption has not been performed and a "non-processed file" refers to a file that has not been processed or, in other words, an uncompressed plaintext file. The non-processing end offset (non-processed chunk size) 2572 stores an end position (an end offset) of a chunk from the top of a non-processed file of the chunk corresponding to the entry and also stores a size (a chunk size) of a non-processed chunk. Alternatively, only one of an end offset and a chunk size may be stored in the non-processing end offset (non-processed chunk size) 2572. The chunk file identifier 2573 stores an identifier (in the present example, a file identifier) for identifying the chunk corresponding to the entry in the cloud storage 30. The chunk file size 2574 stores a file size of a chunk to be stored in the cloud storage 30 or, in other words, a chunk size of a chunk after predetermined processing that corresponds to the chunk. Processing contents 2575 store contents of processing to be executed with respect to the chunk corresponding to the entry. Processing contents include contents of encoding processing (compression processing and/or encryption processing or the like) or the fact that the chunk is non-processed and, for example, when compression processing is executed, a name indicating the compression processing, when encryption processing is executed, a name indicating the encryption processing, and when processing is not performed, "non-processed". The chunk hash value 2576 stores a hash value of the chunk corresponding to the entry.

Next, the chunk map 257B for chunk coupled storage will be described.

FIG. 6 is a configuration diagram of a chunk map for chunk coupled storage according to the embodiment.

The chunk map 257B for chunk coupled storage is a chunk map in a case where chunks are coupled in the cloud storage 30 and stored as a single file (an object when the cloud storage 30 is object storage). The chunk map 257B is provided in correspondence to each file in the file storage 20. The chunk map 257B has an entry for each chunk of a file corresponding to the chunk map 257B. An entry of the chunk map 257B includes fields of a non-processing start offset 2571, a non-processing end offset (non-processed chunk size) 2572, a post-processing start offset 2591, a post-processing end offset (post-processing chunk size) 2592, processing contents 2575, and a chunk hash value 2576. It should be noted that same fields as the chunk map 257A will be denoted by same symbols and redundant descriptions will be omitted. The non-processing end offset (non-processed chunk size) 2572, the post-processing end offset (post-processing chunk size) 2592, and the chunk hash value 2576 are not essential fields for operation.

The post-processing start offset 2591 stores a start position (a start offset) of a chunk from the top of a file after processing of a chunk corresponding to the entry or, in other words, in a coupled state after encoding such as compression or encryption has been performed. The post-processing end offset (post-processing chunk size) 2592 stores an end position (an end offset) of a chunk from the top of a file after processing of the chunk corresponding to the entry and also stores a size (a post-processing chunk size) of the chunk after processing. Alternatively, only one of the end offset and the post-processing chunk size may be stored in the post-processing end offset (post-processing chunk size) 2592.

Next, the chunk map map 255 will be described.

FIG. 7 is a configuration diagram of a chunk map map according to the embodiment.

The chunk map map 255 manages an identifier of a file (a chunk map file) of the chunk map 257 that corresponds to a file (a user file) being used by the user. The chunk map map 255 stores an entry for each user file. A file to be a target of the chunk map map 255 is a file to be a target of a method (the present method) to be used by configuring a processing for the chunk when storing the chunk. An entry of the chunk map map 255 includes fields of a file identifier 2551, a chunk map file identifier 2552, and a storage state 2553.

The file identifier 2551 stores a file identifier of a file corresponding to the entry in the cloud storage 30. The chunk map file identifier 2552 stores a file identifier of a file of the chunk map 257 of the file corresponding to the entry. The storage state 2553 stores a storage state in the cloud storage 30 with respect to the file corresponding to the entry. For example, the storage state is "divided" when each chunk is to be individually stored and "coupled" when chunks are to be coupled and stored.

It should be noted that the chunk map map 255 is not essential for operation. For example, by adopting a naming method of "file path/map" for an identifier of a chunk map file, a file identifier of a chunk map can be identified from a file path. In this case, a storage state (divided/coupled) to the cloud storage 30 with respect to a file may be determined from a table format of a chunk map or the like. In addition, when a chunk map cannot be accessed using the file identifier of the chunk map having been identified from a file path, existing read/write may be executed. Furthermore, while a file to be a target of the chunk map map 255 in the present embodiment is a file to be a target of a method (the present method) to be used by configuring a processing for the chunk when storing the chunk, a file to be a target of the chunk map map 255 is not limited thereto and a file other than a file to be a target of the present method may be a target of the chunk map map 255, and with respect to a file other than a file to be a target of the present method, a value need not be configured in the chunk map file identifier 2552 of a corresponding entry.

Next, processing operations of the computer system 1 according to the present embodiment will be described.

First, file initial storage processing when individual storage of a chunk in the cloud storage 30 is configured (when chunk individual storage is configured) will be described.

Figure 8:
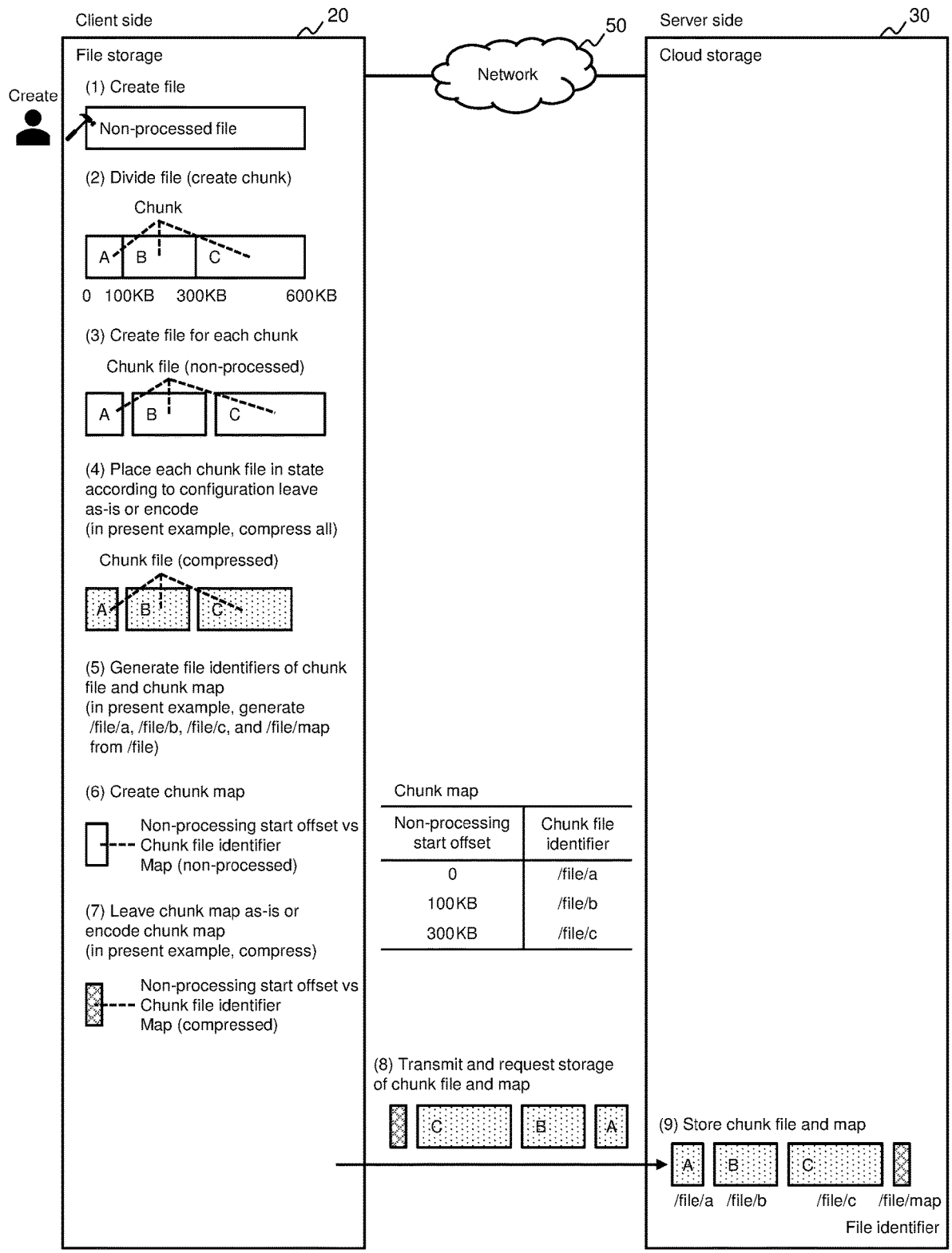
FIG. 8 is a sequence diagram of file initial storage processing when chunk individual storage is configured according to the embodiment.

FIG. 8 is a sequence diagram of file initial storage processing when chunk individual storage is configured according to the embodiment.

In the file storage 20, the CPU 24 creates a file in accordance with, for example, a file creation instruction by the user from the computer 10. The file created at this point is a file (a non-processed file) that has not been subjected to encoding processing (compression processing, encryption processing, or the like) (FIG. 8 (1)). Besides an instruction by the user from the computer 10, a file creation instruction may be an instruction based on processing inside the file storage 20.

Next, the CPU 24 performs processing for dividing the created file into a plurality of chunks (FIG. 8 (2)). In this case, a chunk need only have a size within a range determined in advance and may be a constant size or an arbitrary size. In the example shown in FIG. 8 (2), a non-processed file is divided into a chunk A with an offset range of 0 KB to 100 KB, a chunk B with an offset range of 100 KB to 300 KB, and a chunk C with an offset range of 300 KB to 600 KB. In this case, a notation of 0 KB to 100 KB indicates a range of 0 KB or more and less than 100 KB or, in other words, a range of 0 KB or more and 99999 Bytes (99 KB) or less. A similar description will apply to the notation of other offset ranges.

Next, the CPU 24 creates a file (chunk file) of each chunk (FIG. 8 (3)). A chunk file in this state is called a non-processed chunk file.

Next, for each chunk file, the CPU 24 performs processing corresponding to processing contents having been configured with respect to the chunk (FIG. 8 (4)). In this case, regarding processing contents with respect to a chunk, same processing contents may be configured in advance with respect to all of the chunks of a file or processing contents may be configured for each chunk according to an instruction by the user. A determination to perform compression may be made when a chunk is equal to or larger than a predetermined size. Examples of processing contents include encoding processing (compression processing, encryption processing, and the like). The example shown in FIG. 8 (4) will be described on the assumption that compression processing is to be performed with respect to all of the chunks. When processing contents are "non-processing", no action is taken. A chunk subjected to encoding processing corresponds to an encoded chunk.

Next, the CPU 24 generates, from a file identifier received from the computer 10 as a file name to be created, a file identifier of a chunk file and a file identifier of the chunk map 257A (FIG. 8 (5)). In the example shown in FIG. 8 (5), based on the file identifier "/file", the CPU 24 generates "/file/a", "/file/b", and "/file/c" as file identifiers of chunk files and generates "/file/map" as the file identifier of the chunk map 257A.

Next, the CPU 24 creates the chunk map 257A (FIG. 8 (6)). It should be noted that the file of the chunk map 257A is in a state where encoding processing has not been performed (non-processed).

Next, the CPU 24 determines whether to leave the chunk map 257A as-is (non-processing) or to perform encoding processing (compression processing, encryption processing, or the like) and executes the determined processing (FIG. 8 (7)). Whether to leave the chunk map 257A as-is or to perform encoding processing may be determined in accordance with a default configuration, determined in accordance with the user's configuration or instruction, or a determination to perform compression may be made when the chunk map 257A is equal to or larger than a predetermined size. In the present example, it is assumed that a determination to compress the chunk map 257A has been made and the chunk map 257A is compressed.

Next, the CPU 24 transmits a storage request of the chunk file and the chunk map and transmits data of the chunk file and the chunk map to the cloud storage 30 (FIG. 8 (8)).

In the present example, the chunk map 257A includes an entry of which a non-processing start offset is 0 Bytes and a file identifier of a chunk file is "/file/a", an entry of which a non-processing start offset is 100 KB and a file identifier of a chunk file is "/file/b", and an entry of which a non-processing start offset is 300 KB and a file identifier of a chunk file is "/file/c".

In the cloud storage 30, the CPU 34 respectively separately stores each chunk file and the chunk map having been transmitted from the file storage 20 in the auxiliary storage unit 35 (FIG. 8 (9)). In this case, when the cloud storage 30 is object storage, each chunk file and the chunk map are respectively stored as different objects. On the other hand, in the case of file storage, each chunk file and the chunk map are respectively stored as files. In the cloud storage 30, the chunk file and the chunk map are stored without being encoded. Such functions of processing in the cloud storage 30 can be realized by basic functions included in general cloud storage.

Next, processing (partial read processing) for reading a portion of a file when chunk individual storage is configured will be described.

Figure 9:
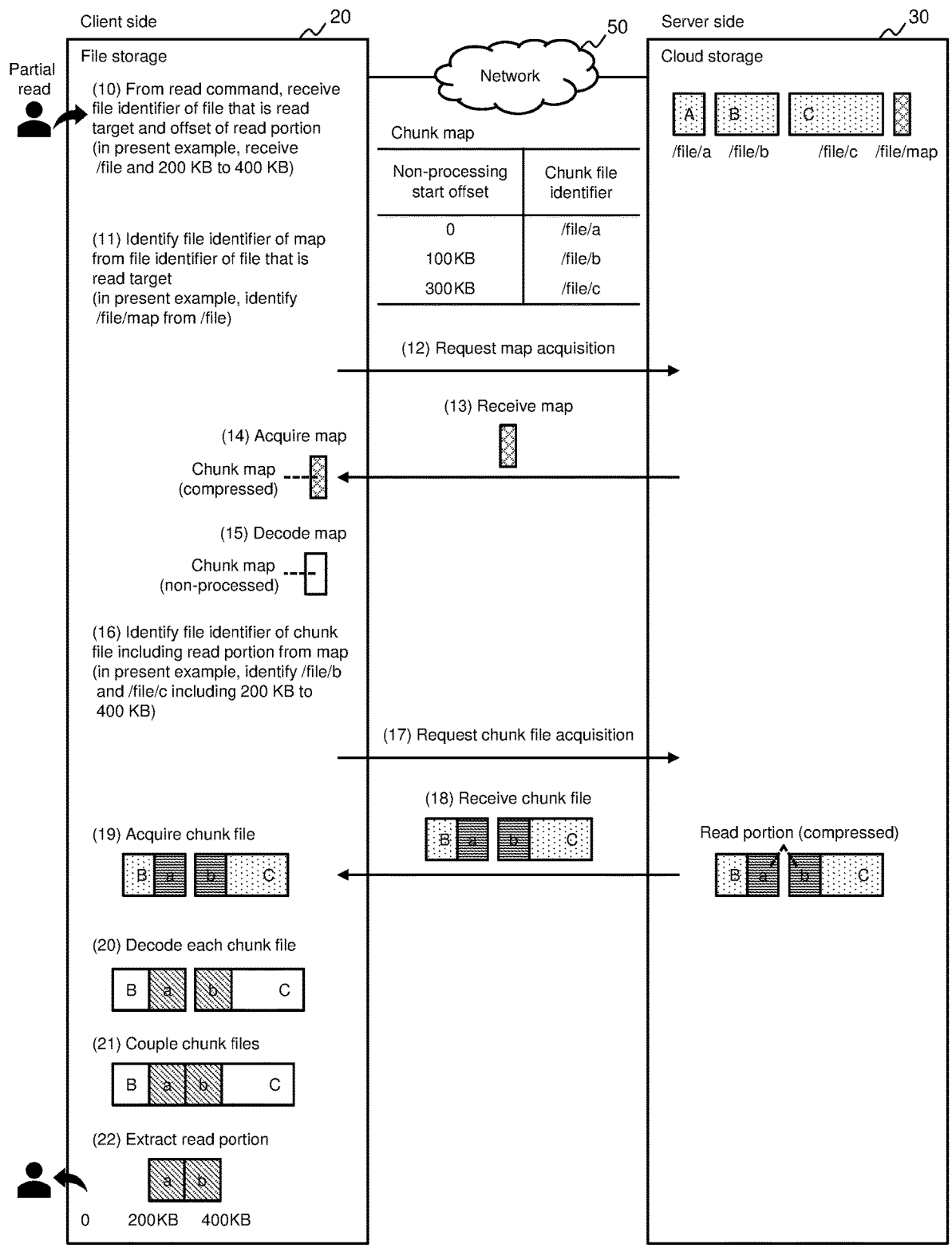
FIG. 9 is a sequence diagram of partial read processing when chunk individual storage is configured according to the embodiment.

FIG. 9 is a sequence diagram of partial read processing when chunk individual storage is configured according to the embodiment.

Partial read processing is executed when the file storage 20 receives, for example, a read command of which a target is data of a part of a file from the computer 10. In this case, the read command includes a file identifier of a file that is a read target and an offset of a portion (a read portion) to be a read target in a non-processed file. In the present example, a description will be given on the assumption that the file identifier is "/file" and the offset is 200 KB to 400 KB. Besides an instruction by the user from the computer 10, a read command may be a command based on processing inside the file storage 20.

The CPU 24 of the file storage 20 receives the file identifier and the offset from the read command (FIG. 9 (10)).

Next, the CPU 24 identifies, from the file identifier of the file that is a read target, a file identifier of the chunk map 257A. In the present example, the CPU 24 identifies, from the file identifier "/file", a file identifier "/file/map" of the chunk map 257A (FIG. 9 (11)). Regarding the identification of the file identifier of the chunk map 257A, the identification may be made based on a creation method of the file identifier of the chunk map 257 or the identification may be made by referring to the chunk map map 255.

Next, the CPU 24 transmits an acquisition request of a chunk map that designates the file identifier of the chunk map 257A to the cloud storage 30 (FIG. 9 (12)).

In response to the acquisition request of the chunk map, the CPU 34 of the cloud storage 30 acquires the chunk map 257A corresponding to the acquisition request from the auxiliary storage unit 35 and transmits the acquired chunk map 257A to the file storage 20 (FIG. 9 (13)). The chunk map 257A is acquired from the cloud storage 30 in order to acquire the latest chunk map 257A in a case where a same file is being shared with other file storages 20.

The CPU 24 of the file storage 20 acquires the chunk map 257A transmitted from the cloud storage 30 (FIG. 9 (14)). In the present example, the acquired chunk map is the compressed chunk map 257A having been stored in FIG. 8 (9). The chunk map 257A is acquired from the cloud storage 30 in order to acquire the latest chunk map 257A in a case where a same file is being shared with other file storages 20.

Next, the CPU 24 executes decoding processing (inverse transformation processing of the encoding processing: in the present example, expansion processing) with respect to the chunk map 257A. Accordingly, the non-processed chunk map 257A can be acquired (FIG. 9 (15)).

Next, the CPU 24 refers to the chunk map 257A and identifies one or more file identifiers of one or more chunk files including a read portion (FIG. 9 (16)). In the present example, since the offset is 200 KB to 400 KB, file identifiers "/file/b" and "/file/c" of the chunk files including this range are identified.

Next, the CPU 24 transmits an acquisition request of a chunk file that designates the file identifier of the identified chunk file to the cloud storage 30 (FIG. 9 (17)).

In response to the acquisition request of the chunk file, the CPU 34 of the cloud storage 30 acquires a chunk file corresponding to the acquisition request from the auxiliary storage unit 35 and transmits the acquired chunk file to the file storage 20 (FIG. 9 (18)). In this case, a portion that combines a portion a in a chunk file B and a portion b in a chunk file C among chunk files B and C is the read portion.

Next, the CPU 24 of the file storage 20 acquires the chunk file having been transmitted from the cloud storage 30 (FIG. 9 (19)).

Next, the CPU 24 makes each chunk file a non-processed chunk file. Specifically, for each chunk file, the CPU 24 performs decoding processing if the file has been subjected to encoding processing. In the present example, since each chunk file has been compressed, expansion processing is executed for each chunk file (FIG. 9 (20)). In the present embodiment, since encoding processing is performed in units of a chunk file, performing decoding processing for each chunk file enables each chunk file to be made a non-processed chunk file.

Next, the CPU 24 couples the respective chunk files having been made non-processed chunk files (FIG. 9 (21)), identifies and extracts a read portion corresponding to the offset of the read command from the coupled chunk file, and transmits data of the extracted read portion to a command source of the read command (for example, the computer 10) (FIG. 9 (22)).

According to the partial read processing described above, since a chunk file including a read portion in a file need only be read from the cloud storage 30, a data amount of communication between the cloud storage 30 and the file storage 20 can be reduced. In addition, a non-processed chunk file can be obtained by performing decoding processing for each chunk file, and data of a read portion in a non-processed state can be extracted from the non-processed chunk file.

Next, processing (partial update processing) for updating a portion of a file when chunk individual storage is configured will be described.

Figure 10:
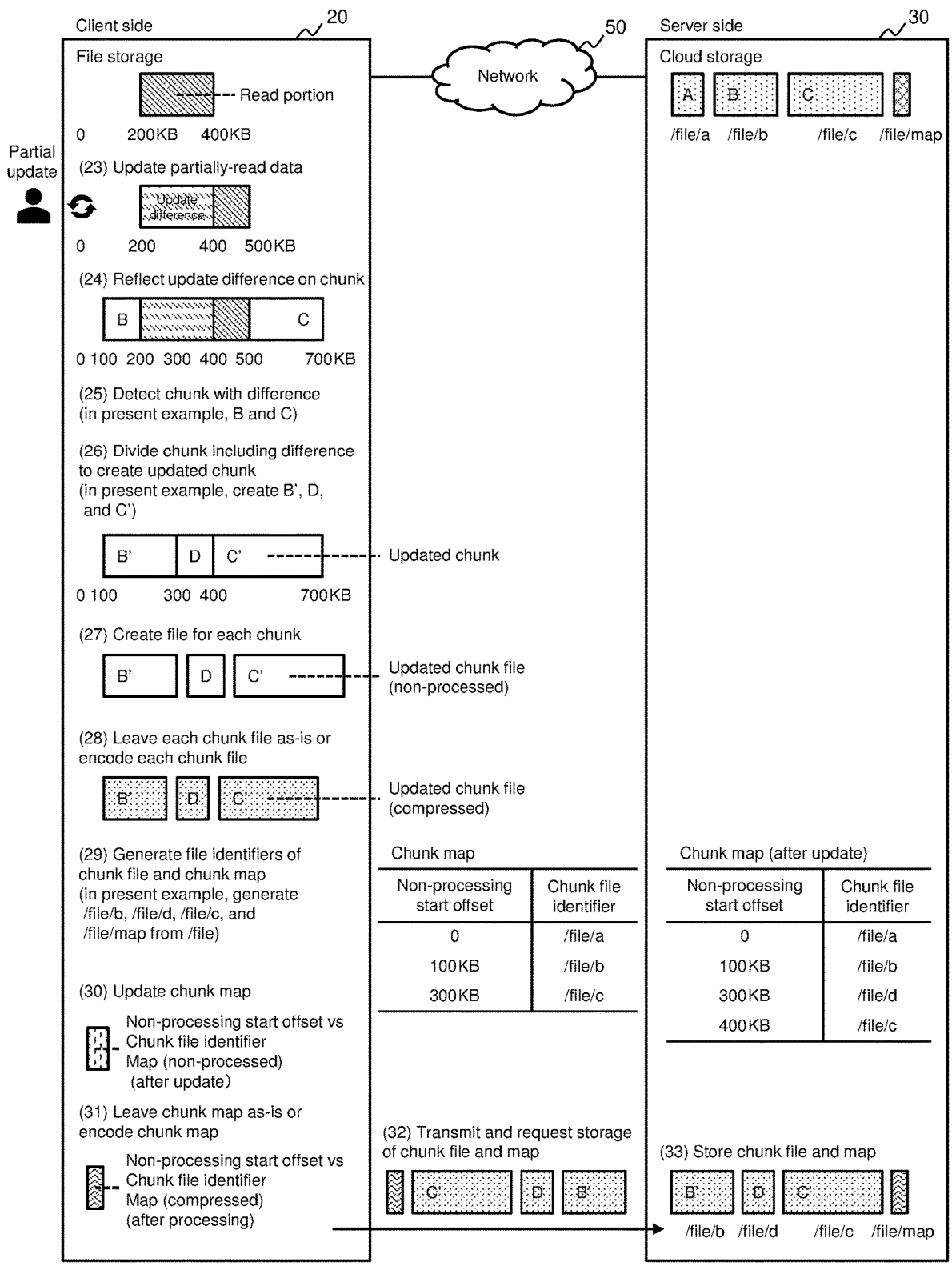
FIG. 10 is a sequence diagram of partial update processing when chunk individual storage is configured according to the embodiment.

FIG. 10 is a sequence diagram of partial update processing when chunk individual storage is configured according to the embodiment.

Partial update processing is processing that is executed upon receiving, after transmitting a read portion from the file storage 20 to, for example, the computer 10 based on a read command, an update with respect to data of the read portion from the computer 10. In the present example, processing when a read portion is updated after the partial read processing shown in FIG. 9 is performed will be described.

When the CPU 24 receives an update of data with respect to a read portion by the user from the computer 10, the CPU 24 performs an update with respect to the read portion (FIG. 10 (23)). In the present example, it is assumed that data of 100 KB with an offset of 200 KB to 300 KB has been updated to data of 200 KB. In this case, the data of the updated portion will be referred to as an update difference.

The CPU 24 reflects the update difference on a chunk having included the read portion (FIG. 10 (24)). In the present example, the CPU 24 creates a file that couples a portion of the chunk B other than the read portion, the read portion including the update difference, and a portion of the chunk C other than the read portion.

Next, the CPU 24 detects a chunk with the difference (FIG. 10 (25)). In the present example, the chunk B and the chunk C are to be detected.

In addition, the CPU 24 divides the chunks including the difference to create new chunks (updated chunks) (FIG. 10 (26)). Whether or not to divide a chunk may be determined in accordance with a default configuration, determined in accordance with the user's configuration or instruction, or a determination to divide a chunk may be made when the chunk is equal to or larger than a predetermined size. In the present example, the CPU 24 divides chunks so that each chunk is within a predetermined size range. In the present example, chunks B', D, and C' are created by the processing. An offset of a non-processed file of the chunk B' is 100 KB to 300 KB, an offset of a non-processed file of the chunk D is 300 KB to 400 KB, and an offset of a non-processed file of the chunk C' is 400 KB to 700 KB. It should be noted that a chunk including a difference need not be divided into new chunks.

Next, the CPU 24 creates a file (a chunk file) of each created chunk (FIG. 10 (27)).

Next, for each created chunk file, the CPU 24 performs processing corresponding to processing contents having been configured with respect to the chunk (FIG. 10 (28)). In the present example, since compression is configured with respect to each chunk, the CPU 24 performs compression processing with respect to each chunk file. A determination to perform compression may be made when a chunk is equal to or larger than a predetermined size.

Next, the CPU 24 generates, from a file identifier of a file including the read portion, a file identifier of a chunk file and a file identifier of the chunk map 257A (FIG. 10 (29)). In the present example, based on the file identifier "/file", the CPU 24 generates "/file/b", "/file/d", and "/file/c" as file identifiers of chunk files and generates "/file/map" as the file identifier of the chunk map 257A.

Next, the CPU 24 updates the chunk map 257A to contents of a new chunk file (FIG. 10 (30)). In the present example, the chunk map 257A includes an entry of which a non-processing start offset is 0 Bytes and a file identifier of a chunk file is "/file/a", an entry of which a non-processing start offset is 100 KB and a file identifier of a chunk file is "/file/b", an entry of which a non-processing start offset is 300 KB and a file identifier of a chunk file is "/file/d", and an entry of which a non-processing start offset is 400 KB and a file identifier of a chunk file is "/file/c".

Next, the CPU 24 determines whether to leave the chunk map 257A as-is or to perform encoding (compression or encryption) and executes the determined processing (FIG. 10 (31)). Whether to leave the chunk map 257A as-is or to perform encoding processing may be determined in accordance with a default configuration or the user's designation or configuration, and a determination to perform compression may be made when the chunk map 257A is equal to or larger than a predetermined size. In the present example, it is assumed that a determination to compress the chunk map 257A has been made and the chunk map 257A is compressed.

Next, the CPU 24 transmits a storage request of the chunk file and the chunk map and transmits data of the chunk file and the chunk map to the cloud storage 30 (FIG. 10 (32)).

In the cloud storage 30, the CPU 34 respectively separately stores each chunk file and the chunk map having been transmitted from the file storage 20 in the auxiliary storage unit 35 (FIG. 10 (33)). According to the processing, the chunk file B is updated to the chunk file B' after the update, the chunk file C is updated to the chunk file C' after the update, and the chunk file D is newly stored.

As described above, with the partial update processing according to the present embodiment, even if a chunk has been encoded, transmitting only a chunk including an update difference to the cloud storage 30 causes the chunk including the update difference to be updated and the like and causes data of a file after the update to be stored at the cloud storage 30.

Next, file initial storage processing when coupled storage of a chunk in the cloud storage 30 is configured (when chunk coupled storage is configured) will be described.

Figure 11:
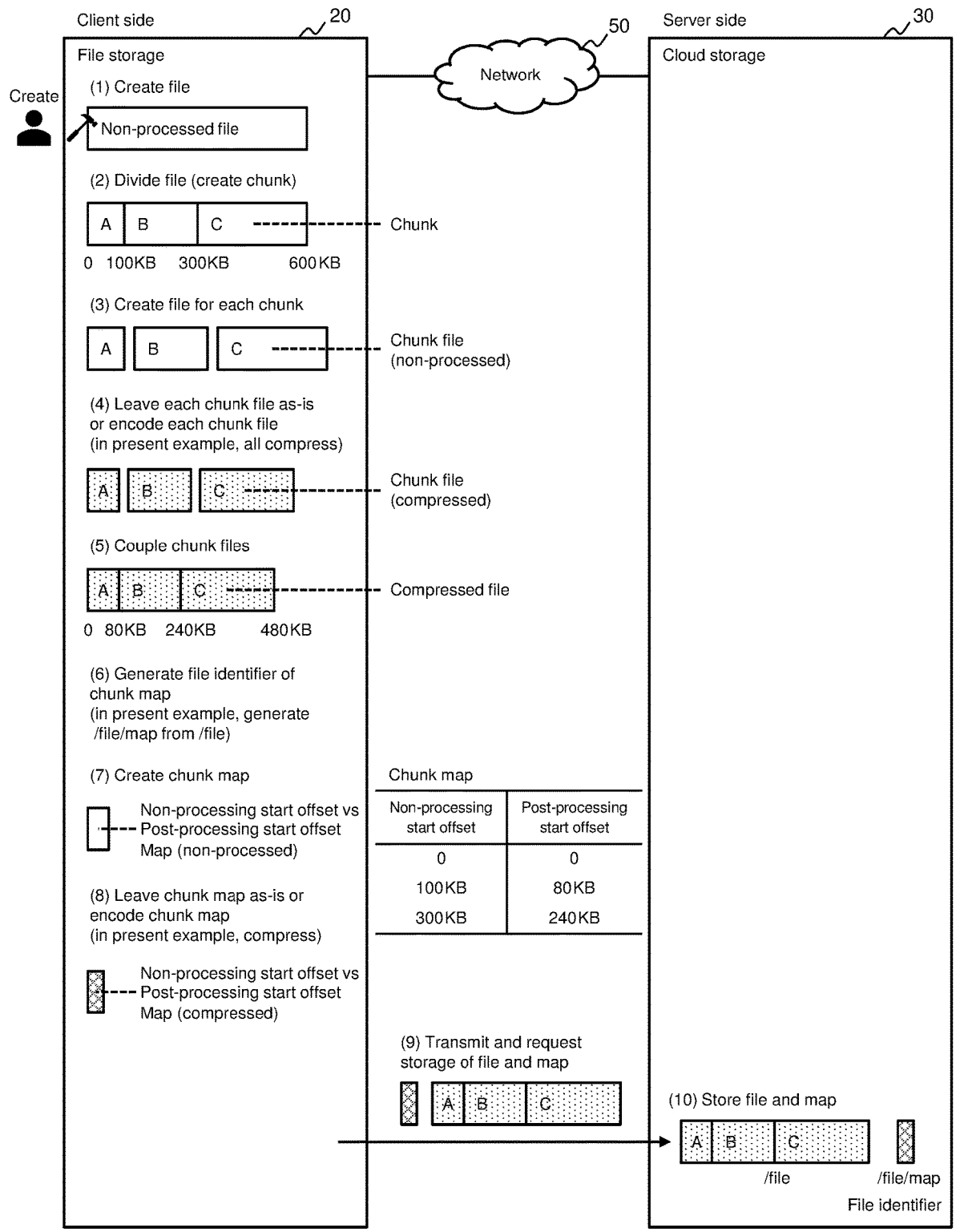
FIG. 11 is a sequence diagram of file initial storage processing when chunk coupled storage is configured according to the embodiment.

FIG. 11 is a sequence diagram of file initial storage processing when chunk coupled storage is configured according to the embodiment.

In the file storage 20, the CPU 24 creates a file in accordance with, for example, an instruction by the user from the computer 10. The file created is a non-processed file that has not been subjected to compression processing or encryption processing (FIG. 11 (1)). Besides an instruction by the user from the computer 10, a file creation instruction may be an instruction based on processing inside the file storage 20.

Next, the CPU 24 performs processing for dividing the created non-processed file into a plurality of chunks (FIG. 11 (2)). In this case, a chunk need only have a size within a range determined in advance and may be a constant size or an arbitrary size. In the present example, a file is divided into a chunk A with an offset range of 0 KB to 100 KB, a chunk B with an offset range of 100 KB to 300 KB, and a chunk C with an offset range of 300 KB to 600 KB.

Next, the CPU 24 creates a file (chunk file) of each chunk (FIG. 11 (3)). A chunk file in this state is called a non-processed chunk file.

Next, for each chunk file, the CPU 24 performs processing corresponding to processing contents having been configured with respect to the chunk (FIG. 11 (4)). In this case, regarding processing contents with respect to a chunk, same processing contents may be configured in advance as a whole or processing contents may be configured for each chunk according to an instruction by the user. The present example will be described on the assumption that compression processing is to be performed with respect to all of the chunks.

Next, the CPU 24 couples chunk files having been subjected to processing corresponding to the configured processing contents to create a single file (FIG. 11 (5)). At this point, in the present example, sizes of the respective chunks change after the processing and the offset of the chunk A after the processing is 0 KB to 80 KB, the offset of the chunk B after the processing is 80 KB to 240 KB, and the offset of the chunk C after the processing is 240 KB to 480 KB.

Next, the CPU 24 generates, from a file identifier received from the computer 10 as a file name of a file to be created, a file identifier of a chunk map 257B (FIG. 11 (6)). In the present example, based on the file identifier "/file", the CPU 24 generates "/file/map" as the file identifier of the chunk map 257B.

Next, the CPU 24 generates the chunk map 257B (FIG. 11 (7)). It should be noted that the file of the chunk map 257B is a file not having been subjected to encoding processing.

Next, the CPU 24 determines whether to leave the chunk map 257B as-is or to perform encoding (compression or encryption) and executes the determined processing (FIG. 11 (8)). Whether to leave the chunk map 257B as-is or to perform encoding processing may be determined in accordance with a default configuration, determined in accordance with the user's configuration or designation, or a determination to perform compression may be made when the chunk map 257B is equal to or larger than a predetermined size. In the present example, it is assumed that a determination to compress the chunk map 257B has been made and the chunk map 257B is compressed.

Next, the CPU 24 transmits a storage request of the file and the chunk map and transmits data of the file and the chunk map to the cloud storage 30 (FIG. 11 (9)).

In the present example, the chunk map 257B includes an entry of the chunk A of which a non-processing start offset is 0 Bytes and a post-processing offset is 0 KB, an entry of the chunk B of which a non-processing start offset is 100 KB and a post-processing offset is 80 KB, and an entry of the chunk C of which a non-processing start offset is 300 KB and a post-processing offset is 240 KB.

In the cloud storage 30, the CPU 34 respectively separately stores each file and the chunk map having been transmitted from the file storage 20 in the auxiliary storage unit 35 (FIG. 11 (10)). In this case, when the cloud storage 30 is object storage, the file and the chunk map are respectively stored as different objects. On the other hand, in the case of file storage, the file and the chunk map are respectively stored as files. In the cloud storage 30, the chunk file and the chunk map are stored without being encoded.

Next, processing (partial read processing) for reading a portion of a file when chunk coupled storage is configured will be described.

Figure 12:
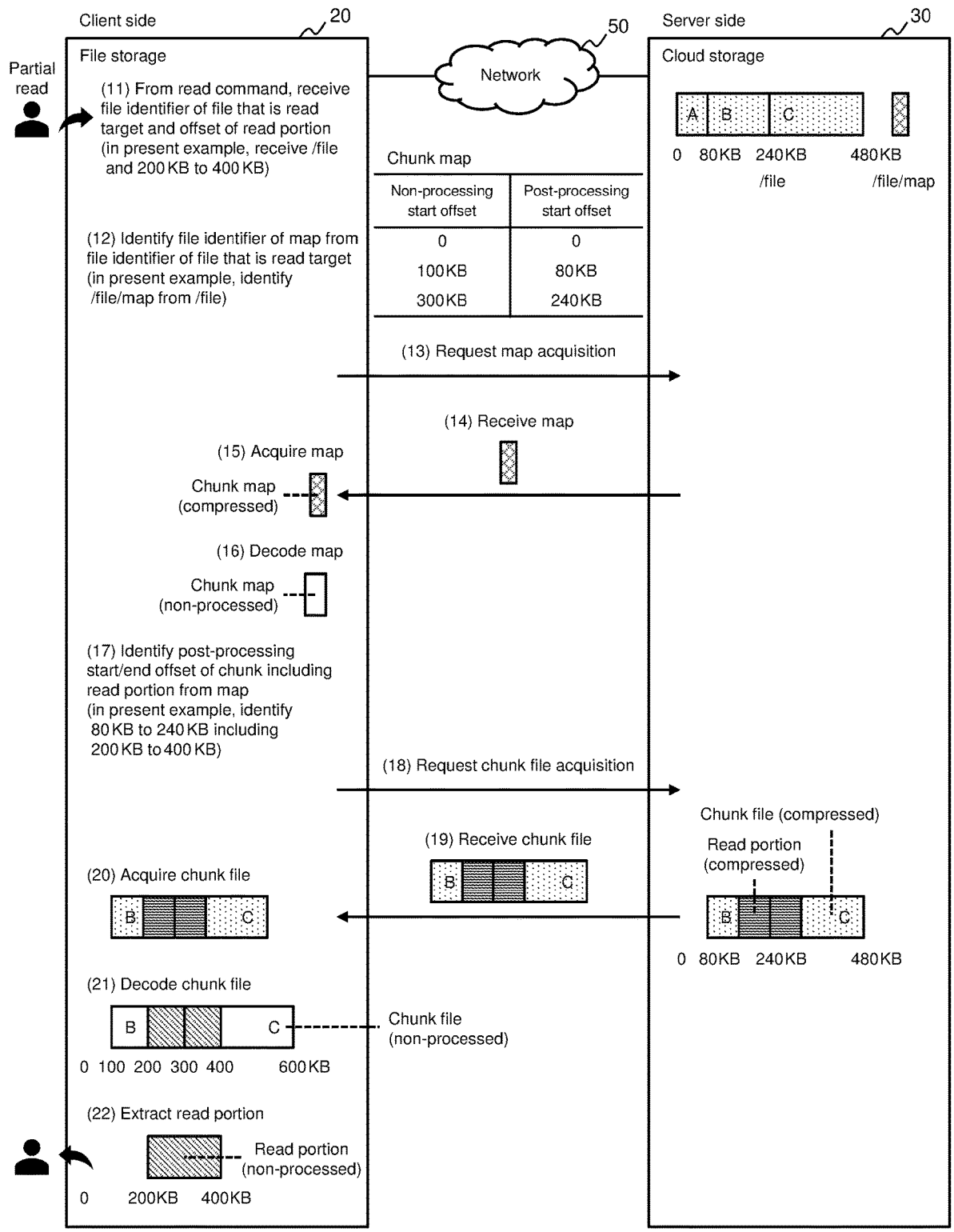
FIG. 12 is a sequence diagram of partial read processing when chunk coupled storage is configured according to the embodiment.

FIG. 12 is a sequence diagram of partial read processing when chunk coupled storage is configured according to the embodiment.

Partial read processing is executed when the file storage 20 receives, for example, a read command by the user from the computer 10. In this case, the read command includes a file identifier of a file that is a read target and an offset of a read portion in a non-processed file. In the present example, a description will be given on the assumption that the file identifier is "/file" and the offset is 200 KB to 400 KB. Besides a command based on an instruction by the user from the computer 10, the read command may be a command based on processing inside the file storage 20.

The CPU 24 of the file storage 20 receives a file identifier and an offset from the read command (FIG. 12 (11)).

Next, the CPU 24 identifies, from a file identifier of the file that is a read target, a file identifier of the chunk map 257B. In the present example, the CPU 24 identifies, from the file identifier "/file", a file identifier "/file/map" of the chunk map 257B (FIG. 12 (12)).

Next, the CPU 24 transmits an acquisition request of a chunk map that designates the file identifier of the chunk map 257B to the cloud storage 30 (FIG. 12 (13)).

In response to the acquisition request of the chunk map 257B, the CPU 34 of the cloud storage 30 acquires the chunk map 257B corresponding to the acquisition request from the auxiliary storage unit 35 and transmits the acquired chunk map 257B to the file storage 20 (FIG. 12 (14)).

The CPU 24 of the file storage 20 acquires the chunk map 257B transmitted from the cloud storage 30 (FIG. 12 (15)). In the present example, the acquired chunk map is the compressed chunk map 257B having been stored in (FIG. 11 (10)). The chunk map 257B is acquired from the cloud storage 30 in order to acquire the latest chunk map 257B in a case where a same file is being shared with other file storages 20.

Next, the CPU 24 executes decoding processing (in the present example, expansion processing) with respect to the chunk map 257B. Accordingly, the non-processed chunk map 257B can be acquired (FIG. 12 (16)).

Next, the CPU 24 refers to the chunk map 257B and identifies, from an offset (a non-processing start/end offset) in a non-processed file of one or more chunk files including the read portion, start and end offsets (post-processing start/end offsets) of the chunk file after the processing (FIG. 12 (17)). In the present example, 80 KB to 240 KB is identified as the post-processing start/end offset of the chunk including 200 KB to 400 KB being the non-processing offset of the read portion.

Next, the CPU 24 transmits an acquisition request of a chunk file that designates the file identifier of the file that is a read target and the post-processing start/end offset to the cloud storage 30 (FIG. 12 (18)).

In response to the acquisition request of a chunk file, the CPU 34 of the cloud storage 30 acquires chunks B and C that correspond to the post-processing start/end offset from the auxiliary storage unit 35 and transmits the acquired chunks as a chunk file to the file storage 20 (FIG. 12 (19)). In this case, a portion that combines a portion in the chunk B and a portion in the chunk C in the acquired chunk file is the read portion.

Next, the CPU 24 of the file storage 20 acquires the chunk file transmitted from the cloud storage 30 (FIG. 12 (20)).

Next, the CPU 24 makes each chunk file in the acquired chunk file a non-processed chunk file. Specifically, for each chunk, decoding processing is performed if the chunk has been subjected to encoding processing. In the present example, since encoding processing that enables a plurality of chunks to be collectively decoded even when encoding in units of a chunk is performed, decoding processing is collectively performed in units of the acquired chunk file (FIG. 12 (21)). When encoding processing is performed in units of a chunk and each chunk must be respectively subjected to decoding processing, each chunk may be identified from the post-processing start offset and the post-processing end offset, a file may be created from each chunk, decoding processing may be executed for each chunk file, and respective chunk files having been subjected to decoding processing may be coupled to make a single non-processed chunk file.

Next, the CPU 24 identifies and extracts a read portion corresponding to the offset of the read command from the non-processed chunk file and transmits data of the extracted read portion to a command source of the read command (for example, the computer 10) (FIG. 12 (22)).

According to the partial read processing described above, since a chunk portion including a read portion in a file need only be read from the cloud storage 30, a data communication amount between the cloud storage 30 and the file storage 20 can be reduced. In addition, a non-processed chunk file can be obtained by performing decoding processing for each chunk, and data of a read portion in a non-processed state can be extracted from the non-processed chunk file.

Next, processing (partial update processing) for updating a portion of a file when chunk coupled storage is configured will be described.

Figure 13:
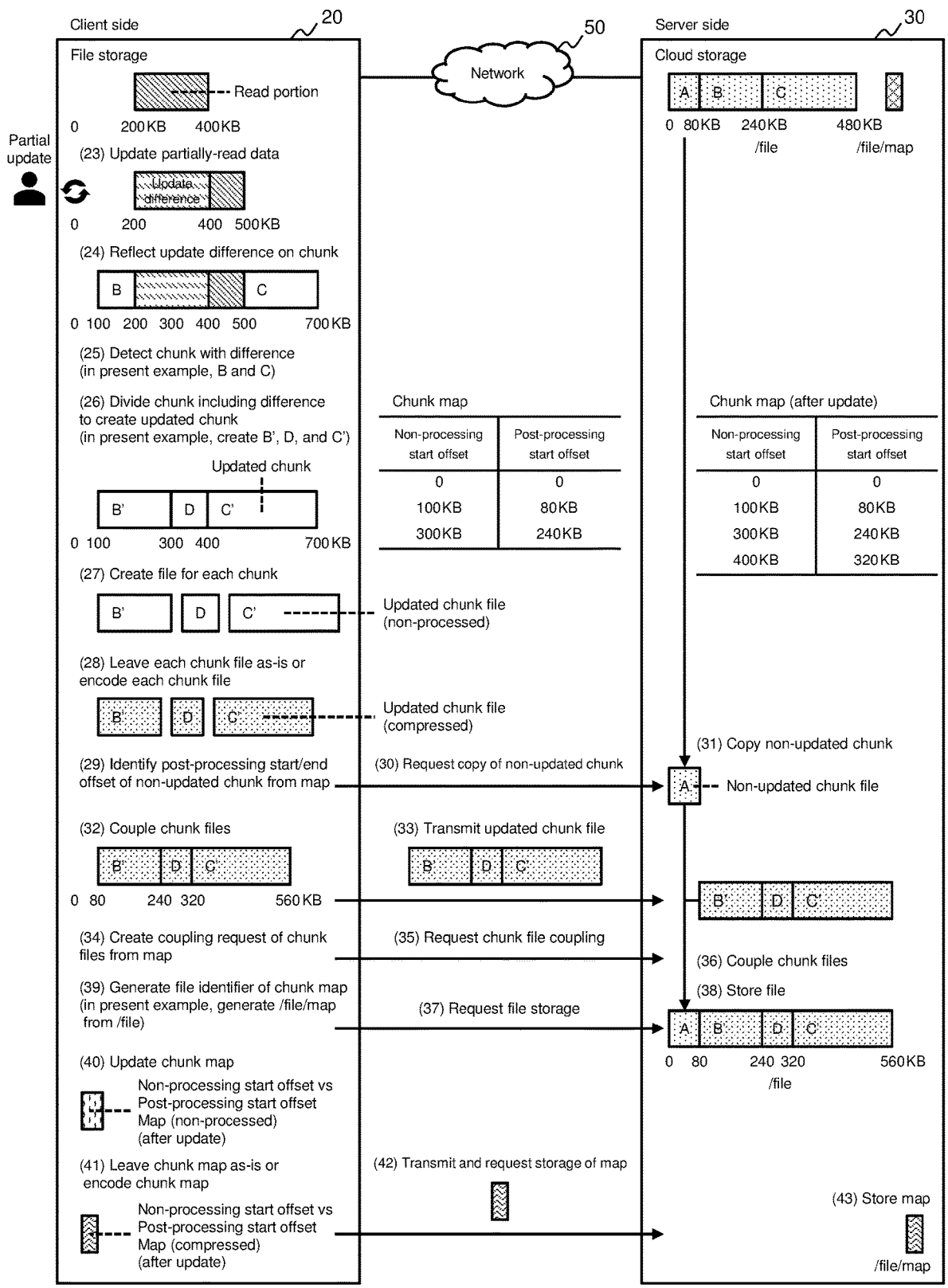
FIG. 13 is a sequence diagram of partial update processing when chunk coupled storage is configured according to the embodiment.

FIG. 13 is a sequence diagram of partial update processing when chunk coupled storage is configured according to the embodiment.

Partial update processing is processing that is executed upon receiving, after transmitting a read portion from the file storage 20 to, for example, the computer 10 based on a read command, an update with respect to data of the read portion from the computer 10. In the present example, processing when a read portion is updated after the partial read processing shown in FIG. 12 is performed will be described.

When the CPU 24 receives an update of data with respect to a read portion by the user from the computer 10, the CPU 24 performs an update with respect to the read portion (FIG. 13 (23)). In the present example, it is assumed that data of 100 KB with an offset of 200 KB to 300 KB has been updated to data of 200 KB. In this case, the updated portion will be referred to as an update difference.

The CPU 24 reflects the update difference on a chunk having included the read portion (FIG. 13 (24)). In the present example, the CPU 24 creates a file in which a portion of the chunk B other than the read portion, the read portion including the update difference, and a portion of the chunk C other than the read portion are coupled.

Next, the CPU 24 detects a chunk with the difference (FIG. 13 (25)). In the present example, the chunk B and the chunk C are to be detected.

In addition, the CPU 24 divides the chunks including the difference to create new chunks (updated chunks) (FIG. 13 (26)). Whether or not to divide a chunk may be determined in accordance with a default configuration, determined in accordance with the user's configuration or instruction, or a determination to divide a chunk may be made when the chunk is equal to or larger than a predetermined size. In the present example, the CPU 24 divides chunks so that each chunk is within a predetermined size range. It should be noted that a chunk including a difference need not be divided into new chunks. In the present example, chunks B', D, and C' are created by the processing. An offset of a non-processed file of the chunk B' is 100 KB to 300 KB, an offset of a non-processed file of the chunk D is 300 KB to 400 KB, and an offset of a non-processed file of the chunk C' is 400 KB to 700 KB.

Next, the CPU 24 creates a file (a chunk file) of each created chunk (FIG. 13 (27)).

Next, for each created chunk file, the CPU 24 performs processing corresponding to processing contents having been configured with respect to the chunk (FIG. 13 (28)). In the present example, since compression is configured with respect to each chunk, the CPU 24 performs compression processing with respect to each chunk file.

Next, the CPU 24 refers to the chunk map 257B, identifies a post-processing start/end offset of a chunk file from an offset (a non-processing start/end offset) in a non-processed file of one or more chunks (non-updated chunks) not having been updated (FIG. 13 (29)), and transmits a non-updated chunk copy request which designates a file identifier of a file and a post-processing start/end offset of the non-updated chunk and which causes the cloud storage 30 to copy the non-updated chunk (FIG. 13 (30)).

At the cloud storage 30 having received the non-updated chunk copy request, the CPU 34 identifies a non-updated chunk designated by the non-updated chunk copy request and copies a non-updated chunk file to, for example, the main storage unit 33 (FIG. 13 (31)). Alternatively, the non-updated chunk file may be copied to the auxiliary storage unit 35.

On the other hand, the CPU 24 of the file storage 20 couples the respective chunk files obtained in FIG. 13 (28) (FIG. 13 (32)) and transmits the coupled file (an updated chunk file) to the cloud storage 30 (FIG. 13 (33)). On the other hand, upon receiving the updated chunk file, the CPU 34 of the cloud storage 30 stores the updated chunk file in, for example, the auxiliary storage unit 35. Alternatively, the updated chunk file may be stored in the main storage unit 33.

In addition, with respect to a non-updated chunk file, the CPU 24 of the file storage 20 refers to the chunk map 257B and checks a post-processing start/end offset, with respect to the updated chunk file, the CPU 24 of the file storage 20 checks a post-processing start/end offset after processing of the configured processing contents having been changed in the update processing, and the CPU 24 of the file storage 20 creates a coupling request (a chunk file coupling request) for causing the cloud storage 30 to couple chunk files in an order in accordance with the post-processing start/end offsets (FIG. 13 (34)) and transmits the chunk file coupling request to the cloud storage 30 (FIG. 13 (35)).

Upon receiving the chunk file coupling request, the CPU 34 of the cloud storage 30 couples, for example, the non-updated chunk file and the updated chunk file in the main storage unit 33 in the order included in the chunk file coupling request (FIG. 13 (36)).

In addition, the CPU 24 of the file storage 20 transmits a file storage request which designates the file identifier of the file and which causes the coupled file to be stored to the cloud storage 30 (FIG. 13 (37)).

Upon receiving the file storage request, the CPU 34 of the cloud storage 30 stores the coupled file as the file identifier being designated in the file storage request in the auxiliary storage unit 35 (FIG. 13 (38)). According to the processing, a file after the update in which the chunks B and C have been updated to the chunks B', D, and C' is to be stored in the auxiliary storage unit 35 of the cloud storage 30.

Furthermore, the CPU 24 of the file storage 20 generates a file identifier of the chunk map 257B after the update (FIG. 13 (39)). In the present example, based on the file identifier "/file", the CPU 24 generates "/file/map" as the file identifier of the chunk map 257B.

Next, the CPU 24 updates the chunk map 257B to contents of a new file (FIG. 13 (40)). In the present example, the chunk map 257B includes an entry of which a non-processing start offset is 0 Bytes and a post-processing start offset is 0 Bytes, an entry of which a non-processing start offset is 100 KB and a post-processing start offset is 80 KB, an entry of which a non-processing start offset is 300 KB and a post-processing start offset is 240 KB, and an entry of which a non-processing start offset is 400 KB and a post-processing start offset is 320 KB.

Next, the CPU 24 determines whether to leave the chunk map 257B as-is or to perform encoding (compression or encryption) and executes the determined processing (FIG. 13 (41)). Whether to leave the chunk map 257B as-is or to perform encoding processing may be determined in accordance with a default configuration, determined in accordance with the user's configuration or instruction, or a determination to perform compression may be made when the chunk map 257B is equal to or larger than a predetermined size. In the present example, it is assumed that a determination to compress the chunk map 257B has been made and the chunk map 257B is compressed.

Next, the CPU 24 transmits a storage request of the updated chunk map 257B and transmits data of the chunk map 257B to the cloud storage 30 (FIG. 13 (42)).

In the cloud storage 30, the CPU 34 stores the chunk map 257B having been transmitted from the file storage 20 (FIG. 13 (43)).

Next, a state transition of a chunk according to each processing in the computer system 1 will be described.

Figure 14:
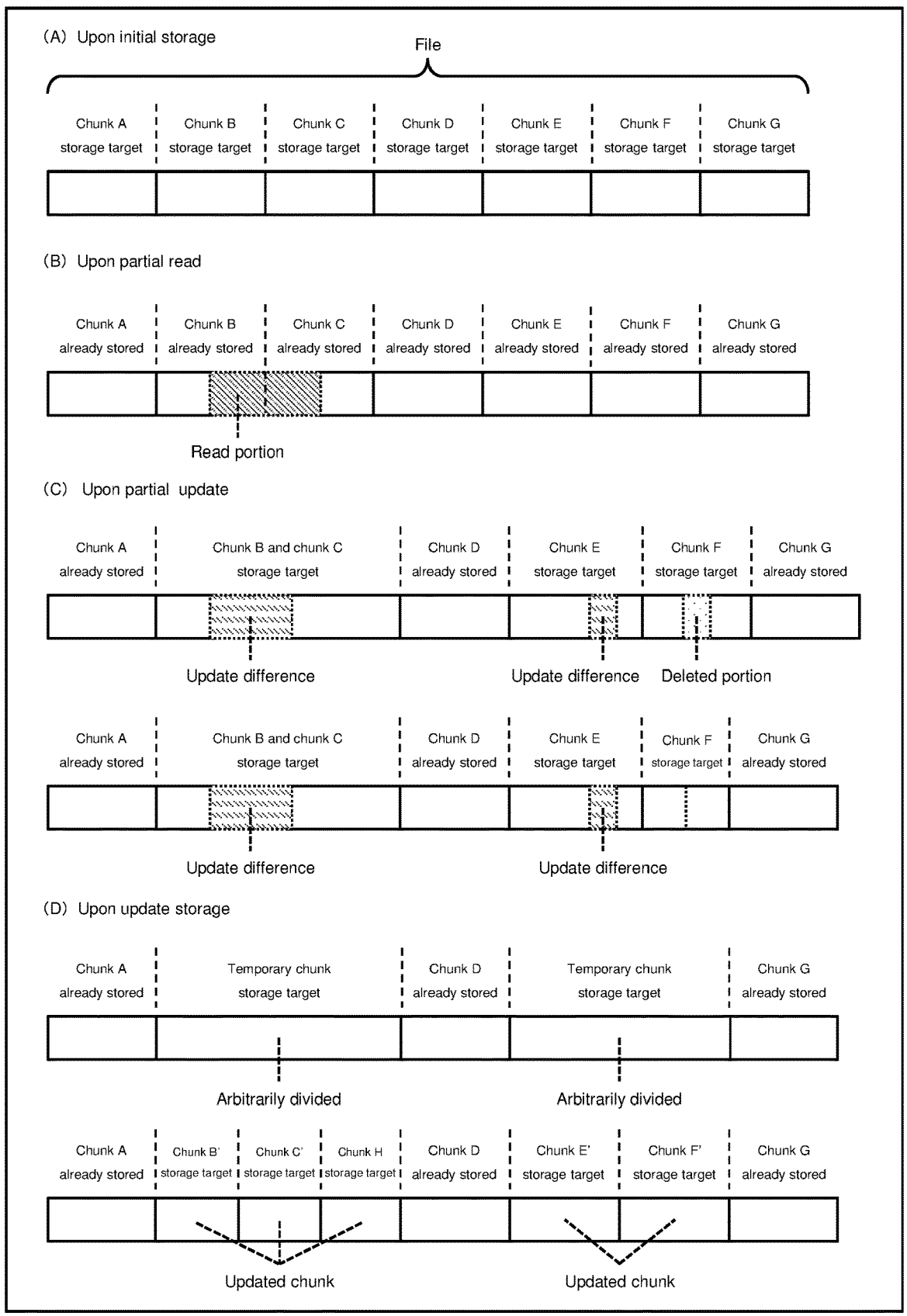
FIG. 14 is a diagram for illustrating a state transition of a chunk according to the embodiment.

FIG. 14 is a diagram for illustrating a state transition of a chunk according to the embodiment. FIG. 14(A) shows a state of a file upon initial storage of the file, FIG. 14(B) shows a state of the file upon partial read, FIG. 14(C) shows a state of the file upon partial update, and FIG. 14(D) shows a state of the file upon update storage. In FIG. 14, a "storage target" indicates that a chunk is a target of storage in the cloud storage 30 and "already stored" indicates that a chunk has already been stored in the cloud storage 30.

When initial storage of a file has been performed according to the present embodiment, since all chunks of the file are storage targets as shown in FIG. 14(A), each chunk that constitutes the file is stored in a state being configured in the processing contents (a non-processed or an encoded state) in the auxiliary storage unit 35 of the cloud storage 30. It should be noted that, in the present embodiment, there are cases where each chunk is managed as a separate file (or object) and cases where chunks are coupled and managed as a single file (or object).

When performing a partial read of a file of which all chunks have already been stored, as shown in FIG. 14(B), chunks (in the drawing, chunks B and C) including a read portion to be a read target are read to the file storage 20 from the cloud storage 30.

When a partial update is performed as shown in a file in an upper part of FIG. 14(C), a state is transits to the state shown in a file in a lower part of FIG. 14(C). For example, when an update difference is present in a portion that straddles the chunk B and the chunk C, the chunk B and the chunk C become storage targets and are updated as shown in the file in the lower part of FIG. 14(C). In addition, as shown in a chunk E, when an update difference is present in a single chunk, only the chunk becomes a storage target and is updated. Furthermore, when a part of a chunk is deleted as shown in a chunk F, the chunk becomes a storage target and the chunk is updated with the exception of the deleted portion.

When performing update storage in the auxiliary storage unit 35 of the cloud storage 30 after a partial update is performed as shown in the file in the lower part of FIG. 14(C), for example, the partially updated chunk B and chunk C are coupled as a temporary chunk as shown in a file in an upper part of FIG. 14(D), and the temporary chunk is divided into a plurality of chunks (in the drawing, chunks B', C', and H) and stored as shown in a file in a lower part of FIG. 14(D). In addition, for example, when continuous chunks E and F are respectively updated as shown in the file in the lower part of FIG. 14(C), for example, the chunks E and F are coupled as a temporary chunk as shown in the file in the upper part of FIG. 14(D), and the temporary chunk is divided into a plurality of chunks (in the drawing, chunks E' and F') and stored as shown in the file in the lower part of FIG. 14(D).

Next, various processing operations in the file storage 20 will be described.

First, a processing operation of file initial storage processing will be described.

Figure 15:
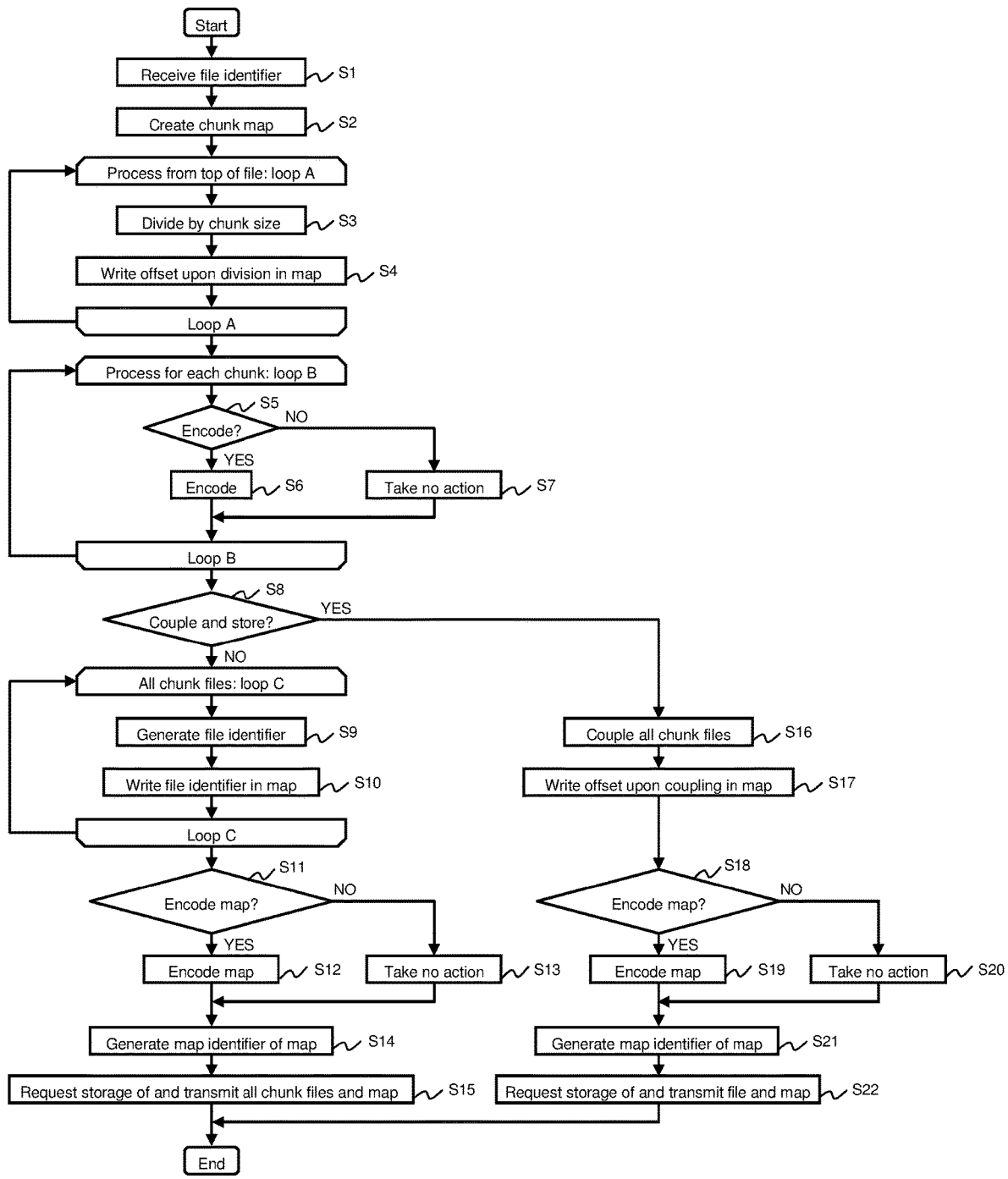
FIG. 15 is a flow chart of file initial storage processing according to the embodiment.

FIG. 15 is a flow chart of file initial storage processing according to the embodiment.

The CPU 24 of the file storage 20 receives a designation of a file identifier in the cloud storage 30 with respect to a file that is a storage target from the computer 10 (step S1). Besides a designation by the user from the computer 10, a designation of a file identifier may be a designation based on processing inside the file storage 20.

Next, the CPU 24 creates the chunk map 257 corresponding to the file that is the storage target (step S2). It should be noted that the chunk map 257 is one of the chunk maps 257A and 257B in accordance with a storage configuration of the file that is the storage target in the cloud storage 30.

Next, the CPU 24 repetitively executes processing (steps S3 and S4) of a loop A by sequentially using pieces of data from the top of the file as targets.

In the processing of the loop A, the CPU 24 creates a chunk file by dividing data of the file by a predetermined chunk size (step S3) and writes a start offset in the file of the chunk file to the chunk map 257 (step S4).

When there is an unprocessed portion in the data of the file that is the storage target, the CPU 24 executes the processing of the loop A using data from the top of the unprocessed portion as a target. On the other hand, when the processing of the loop A has been executed on all of the pieces of data of the file that is the storage target, the CPU 24 executes processing (steps S5 to S7) of a loop B using each of the chunks as a target.

In the processing of the loop B, the CPU 24 determines whether or not to execute encoding with respect to a chunk file that is a processing target (step S5). Whether or not to execute encoding with respect to a chunk file may be determined in accordance with a default configuration, determined in accordance with the user's configuration or designation, or a determination to perform encoding may be made when the chunk file is equal to or larger than a predetermined size. When the CPU 24 determines to encode the chunk file that is a processing target (step S5: YES), the CPU 24 executes encoding processing with respect to the chunk file that is the processing target (step S6). On the other hand, when it is determined that encoding is not to be performed (step S5: NO), no action is taken with respect to the chunk file (step S7).

Next, the CPU 24 executes the processing of the loop B with the respective chunk files as targets, and once the processing of the loop B has been executed with all of the chunk files as targets, the CPU 24 advances the processing to step S8.

In step S8, the CPU 24 determines whether or not a configuration (a chunk coupled storage configuration) to couple and store chunk files of chunks that constitute a file has been set in the cloud storage 30. As a result, when the chunk coupled storage configuration has not been set (step S8: NO), the CPU 24 executes processing when chunk individual storage is configured of steps S9 to S15 in which the chunks are stored in individual files (or objects). On the other hand, when a configuration of coupling chunks into a single file (or object) and storing the file (or object) has been set (step S8: YES), the CPU 24 executes processing when chunk coupled storage is configured of steps S16 to S22.

In the processing when chunk individual storage is configured, the CPU 24 executes processing (steps S9 and S10) of a loop C with respect to each of all chunk files.

In the processing of the loop C, the CPU 24 generates a file identifier in the cloud storage 30 with respect to a chunk file that is a processing target (step S9), and writes the generated file identifier into an entry corresponding to the chunk file in the chunk map 257A (step S10). Specifically, the file identifier is stored in the chunk file identifier 2573.

The CPU 24 executes the processing of the loop C with the respective chunk files as targets, and once the processing of the loop C has been executed with respect to all chunk files, the CPU 24 advances the processing to step S11.

In step S11, the CPU 24 determines whether or not a configuration to encode and store the chunk map 257A has been set. As a result, when the CPU 24 determines that a configuration to encode and store the chunk map 257A has been set (step S11: YES), the CPU 24 executes encoding processing with respect to the chunk map 257A (step S12) and advances the processing to step S14. On the other hand, when the CPU 24 determines that a configuration to encode and store the chunk map 257A has not been set (step S11: NO), the CPU 24 takes no action (step S13) and advances the processing to step S14.

In step S14, the CPU 24 generates a file identifier of a file of the chunk map 257A based on the received file identifier.

Next, the CPU 24 transmits a storage request of all chunk files of the file that is the storage object and the chunk map 257A to the cloud storage 30 and transmits all of the chunk files and the chunk map 257A (step S15), and ends the processing. Accordingly, the cloud storage 30 respectively separately stores all of the chunk files and the chunk map having been transmitted from the file storage 20 in the auxiliary storage unit 35. Such functions of processing in the cloud storage 30 can be realized by basic functions included in general cloud storage.

On the other hand, in processing when chunk coupled storage is configured, the CPU 24 couples all chunk files constituting the file that is the storage target (step S16).

Next, the CPU 24 writes an offset of each chunk file upon coupling in the chunk map 257B (step S17). Specifically, a start offset in a file of each chunk file that constitutes the file is stored in the post-processing start offset 2591 of each entry that corresponds to the chunk file, and stores an end offset and/or a chunk size after processing in the file of each chunk file in the post-processing end offset (post-processing chunk size) 2592 of the entry that corresponds to each chunk file.

Next, the CPU 24 determines whether or not a configuration to encode and store the chunk map 257B has been set (step S18). As a result, when the CPU 24 determines that a configuration to encode and store the chunk map 257B has been set (step S18: YES), the CPU 24 executes encoding processing with respect to the chunk map 257B and advances the processing to step S21. On the other hand, when the CPU 24 determines that a configuration to encode and store the chunk map 257B has not been set (step S18: NO), the CPU 24 takes no action (step S20) and advances the processing to step S21.

In step S21, the CPU 24 generates a file identifier of the chunk map 257B based on the received file identifier.

Next, the CPU 24 transmits a storage request of the file that is the storage object and the chunk map 257B to the cloud storage 30 and transmits the file and the chunk map 257B (step S22), and ends the processing. Accordingly, the cloud storage 30 stores the file and the chunk map having been transmitted from the file storage 20 in the auxiliary storage unit 35. Such functions of processing in the cloud storage 30 can be realized by basic functions included in general cloud storage.

Next, partial read processing will be described.

Figure 16:
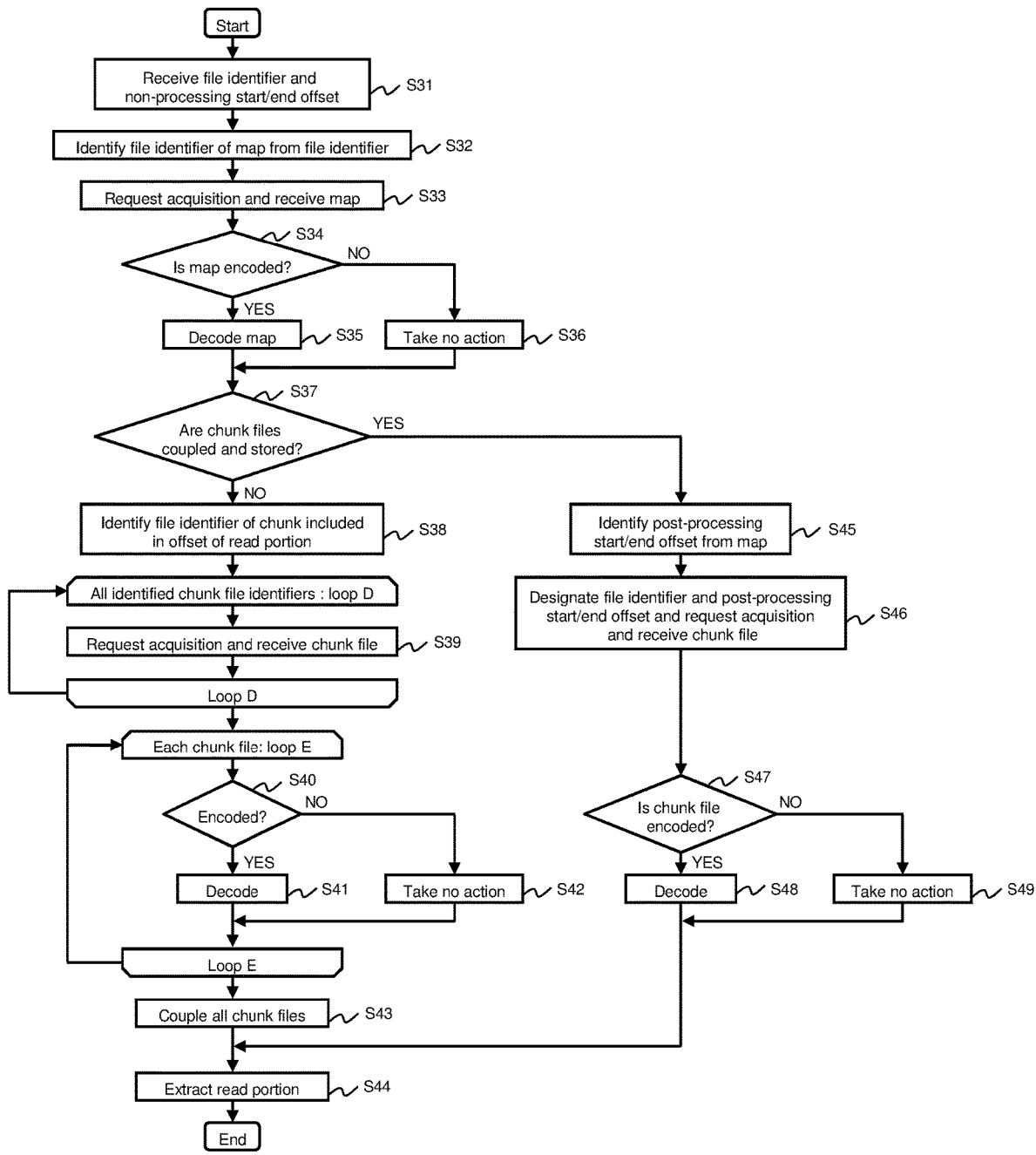
FIG. 16 is a flow chart of partial read processing according to the embodiment.

FIG. 16 is a flow chart of partial read processing according to the embodiment.

The CPU 24 of the file storage 20 receives a read command with respect to a part of a file by the user from the computer 10 (step S31). In this case, the read command includes a file identifier of a file that is a read target and an offset (a non-processing start/end offset) of a read portion in a non-processed file.

Next, the CPU 24 identifies, from the file identifier of the file that is the read target, a file identifier of the chunk map 257 (257A or 257B) in the cloud storage 30 (step S32). Regarding a method of identifying a file identifier of the chunk map 257, the identification may be made based on a creation method of the file identifier of the chunk map 257 or the identification may be made by referring to the chunk map map 255.

Next, the CPU 24 transmits an acquisition request of a chunk map that designates the file identifier of the chunk map 257 to the cloud storage 30 and receives the chunk map 257 from the cloud storage 30 (step S33). Such functions of processing in the cloud storage 30 in this case can be realized by basic functions included in general cloud storage.

Next, the CPU 24 of the file storage 20 determines whether or not the received chunk map 257 has been encoded (step S34) and, when the chunk map 257 has been encoded (step S34: YES), the CPU 24 executes decoding processing with respect to the received chunk map (step S35). On the other hand, when it is determined that the received chunk map 257 has not been encoded (step S34: NO), no action is taken with respect to the chunk map (step S36). Accordingly, the non-processed chunk map 257 can be acquired.

Next, the CPU 24 determines whether or not chunk files of chunks that constitute the file that is the read target are coupled and stored (step S37), and when the chunk files are not coupled and stored (step S37: NO), the CPU 24 executes processing when chunk individual storage is configured of steps S38 to S44 in which the chunks are individually stored. On the other hand, when chunks are coupled and stored (step S37: YES), the CPU 24 executes processing when chunk coupled storage is configured of steps S45 to S49 and S44. In this case, regarding a method of determining whether or not chunk files are coupled and stored, the determination may be made by identifying whether the chunk map 257 is the chunk map 257A or the chunk map 257B based on a configuration of an entry of the chunk map 257 or the determination may be made by referring to the chunk map map 255.

In processing when chunk individual storage is configured, the CPU 24 identifies, from the chunk map 257A, a file identifier of a chunk file being the non-processing start/end offset included in an offset of the read portion that is the read target (step S38).

Next, the CPU 24 executes processing (step S39) of a loop D using each of the chunk files corresponding to all identified file identifiers as targets.

In the loop D, the CPU 24 designates a file identifier with respect to a chunk file that is a processing target, issues a request for acquisition of the chunk file to the cloud storage 30, and receives the chunk file (step S39). Such functions of processing in the cloud storage 30 can be realized by basic functions included in general cloud storage.

Next, when there is a chunk file that is not a processing target, the CPU 24 executes the processing of the loop D with the chunk file as the processing target, and once the processing of the loop D has been executed with respect to all identified chunk files, the CPU 24 advances the processing to processing (steps S40 to S42) of a loop E using all acquired chunk files as targets.

In the loop E, the CPU 24 determines whether or not the received chunk file has been encoded (step S40) and, when it is determined that the received chunk file has been encoded (step S40: YES), the CPU 24 executes decoding processing with respect to the received chunk file (step S41). On the other hand, when it is determined that the received chunk file has not been encoded (step S40: NO), no action is taken with respect to the chunk file (step S42). In this case, whether or not the received chunk file has been encoded may be determined based on a format of the chunk file or determined based on processing contents of the chunk map 257.

Next, when the processing of the loop E has not been performed using all acquired chunk files as targets, the CPU 24 executes the processing of the loop E using the chunk file that has not been subjected to the processing of the loop E as target, but when the processing of the loop E has been performed using all acquired chunk files as targets, the CPU 24 couples all chunk files after performing the processing of the loop E (step S43), identifies and extracts a read portion from the coupled non-processed chunk file, transmits data of the read portion to the computer 10 that is the read command source (step S44), and ends the processing. Such functions of processing in the cloud storage 30 can be realized by basic functions included in general cloud storage.

On the other hand, in processing when chunk coupled storage is configured, the CPU 24 identifies, from the chunk map 257B, a post-processing start/end offset in a file with respect to one or more (or all) chunks being a non-processing start/end offset included in an offset of the read portion that is the read target (step S45).

Next, the CPU 24 transmits, to the cloud storage 30, a transmission request of a chunk file that designates the file identifier of the file that is the read target and the post-processing start/end offset of the chunk of the read portion and receives a corresponding chunk file (step S46). Such functions of processing in the cloud storage 30 in this case can be realized by basic functions included in general cloud storage.

Next, the CPU 24 determines whether or not the received chunk file has been encoded (step S47) and, when the received chunk file has been encoded (step S47: YES), the CPU 24 executes decoding processing with respect to the received chunk file (step S48). On the other hand, when the received chunk file has not been encoded (step S47: NO), no action is taken with respect to the chunk file (step S49). Accordingly, a non-processed chunk file can be acquired. In this case, whether or not the received chunk file has been encoded may be determined based on a format of the chunk file or determined based on processing contents of the chunk map 257. When the received chunk file has a format which couples a plurality of chunk files and processing contents of the respective chunk files differ from each other or, even when the respective chunk files have the same processing contents (for example, same encoding processing) but decoding processing cannot be performed in a coupled state, each chunk in the received chunk file is identified based on a post-processing start/end offset, each chunk is created as a chunk file, processing of steps S47 to S49 is performed with respect to each chunk file, and the chunk files after the processing are coupled.

Next, the CPU 24 identifies a read portion from the chunk file to extract data of the read portion, transmits the data of the read portion to the computer 10 that is the read command source (step S44), and ends the processing.

Next, a processing operation of partial update processing will be described.

Figure 17:
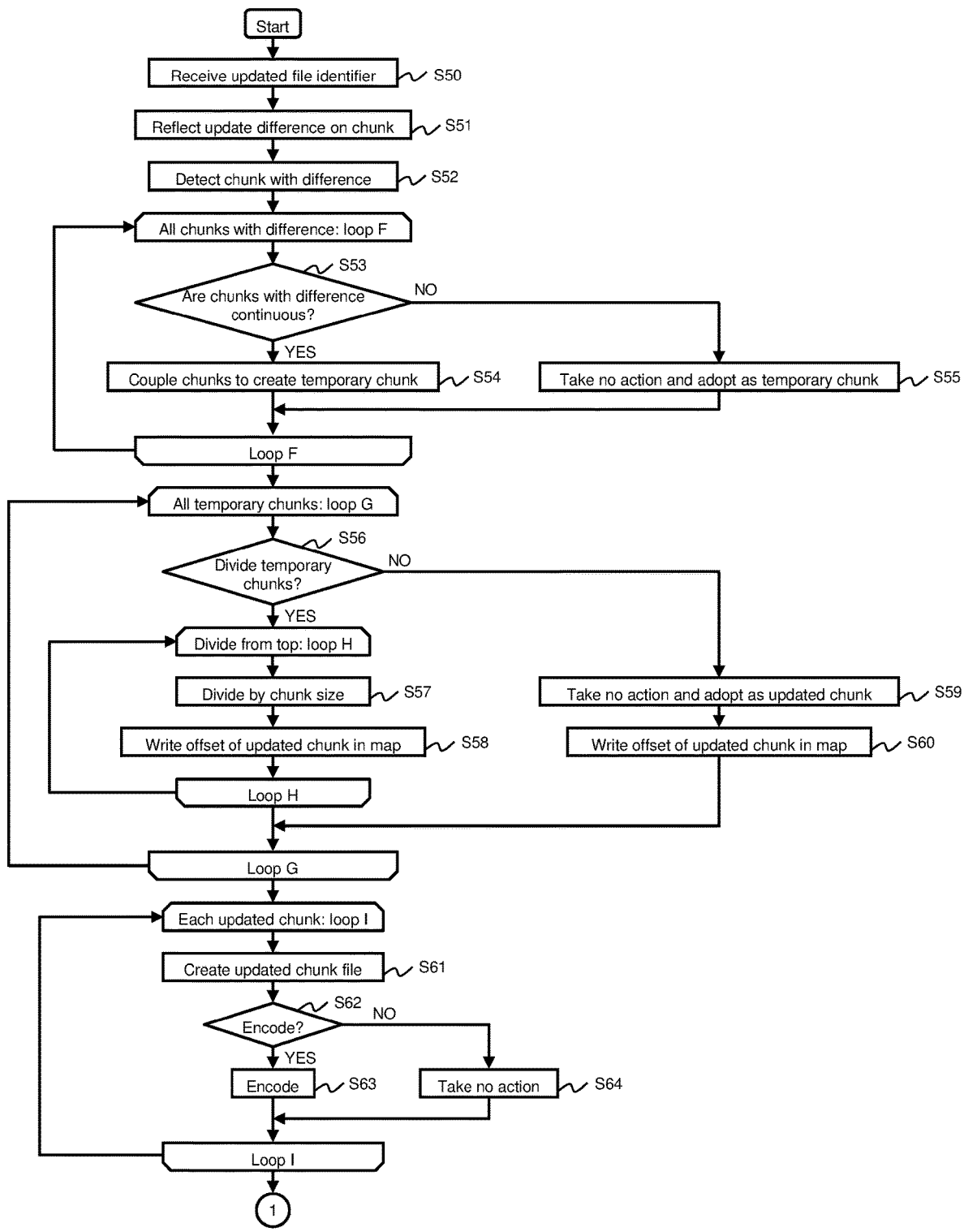
FIG. 17 is a first flow chart of partial update processing according to the embodiment.
Figure 18:
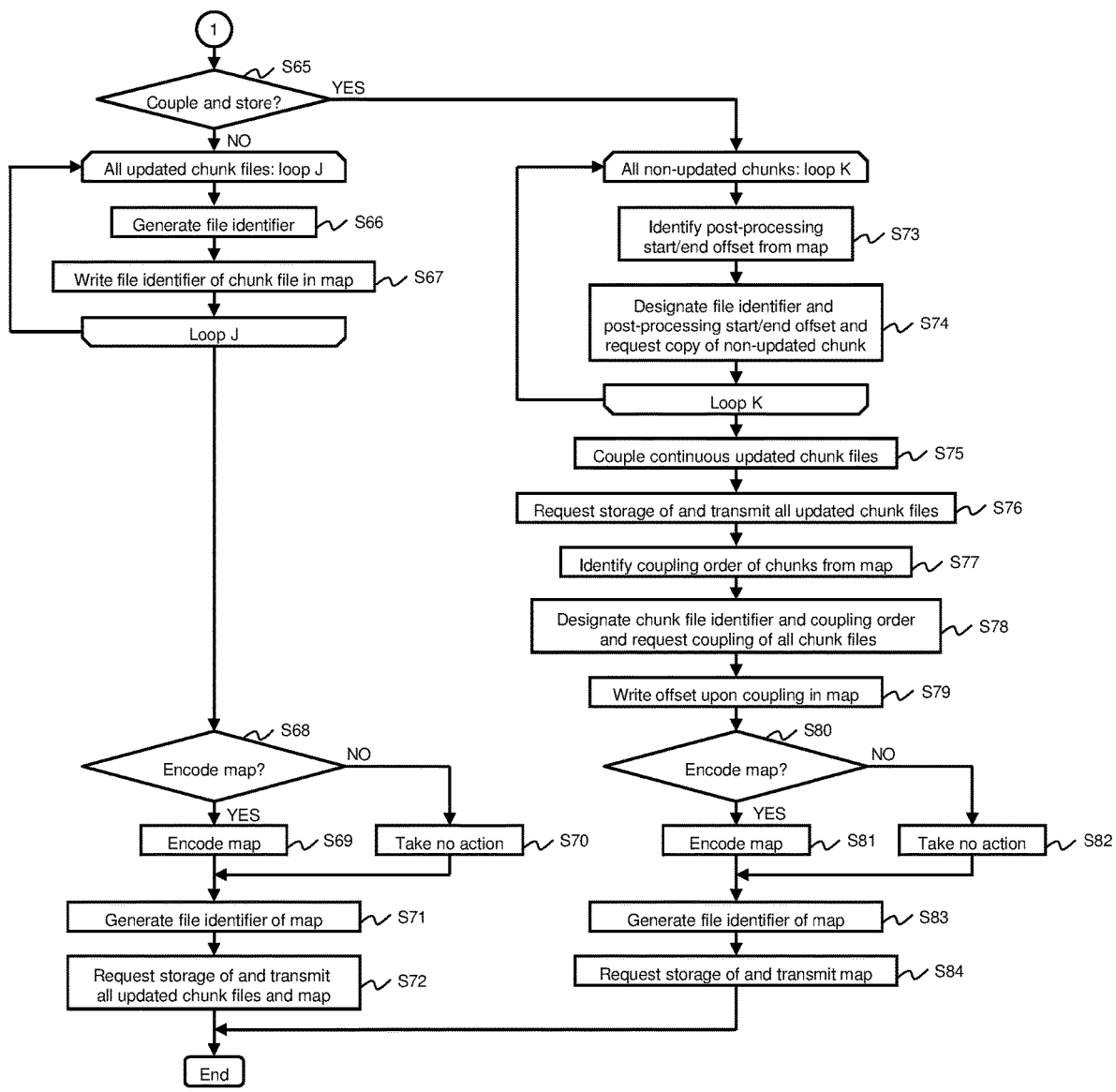
FIG. 18 is a second flow chart of partial update processing according to the embodiment.

FIG. 17 is a first flow chart of partial update processing according to the embodiment. FIG. 18 is a second flow chart of partial update processing according to the embodiment.

Partial update processing is processing that is executed upon the file storage 20 receiving, after transmitting a read portion to the computer 10 based on a read command, an update with respect to data of the read portion from the computer 10. In the present example, processing when a read portion is updated after the partial read processing shown in FIG. 16 is performed will be described.

The CPU 24 receives a file identifier of a file to be updated by the user from the computer 10 (step S50).

Next, the CPU 24 reflects an update difference on a chunk file having been read by a partial read (step S51). Specifically, the CPU 24 couples a portion other than the read portion of the read chunk file with respect to the read portion including the update difference.

Next, the CPU 24 detects a chunk having the difference in the coupled file (step S52).

Next, the CPU 24 executes processing (steps S53 to S55) of a loop F using each of all chunks (difference chunks) having the difference as targets.

In the processing of the loop F, the CPU 24 determines whether or not a difference chunk to be a target is continuous with another difference chunk (step S53). As a result, when the difference chunk to be a target is continuous with another difference chunk (step S53: YES), the difference chunk to be a target is coupled with the other difference chunk that is continuous therewith to create a temporary chunk (step S54). On the other hand, when the difference chunk to be a target is not continuous with another difference chunk (step S53: NO), the difference chunk to be a target is adopted as a temporary chunk (step S55).

Next, when the processing of the loop F has not been performed using all difference chunks as targets, the CPU 24 executes the processing of the loop F using the difference chunk that has not been subjected to the processing of the loop F as target. On the other hand, when the processing of the loop F has been performed using all difference chunks as targets, the CPU 24 advances the processing to processing (steps S56 to S60) of a loop G using all temporary chunks as targets.

In the processing of the loop G, the CPU 24 determines whether or not to divide the temporary chunk (step S56).

Whether or not to divide the temporary chunk may be determined in accordance with a default configuration, determined in accordance with the user's configuration or instruction, or a determination to divide the temporary chunk may be made when the temporary chunk is equal to or larger than a predetermined size.

Next, when the CPU 24 determines to divide the temporary chunk (step S56: YES), the CPU 24 executes processing (steps S57 and S58) of a loop H with respect to data from a top of the temporary chunk.

In the processing of the loop H, with respect to the temporary chunk, the CPU 24 divides data of a predetermined size from an unprocessed top and creates a chunk (an updated chunk) (step S57), and writes an offset of the created updated chunk in the chunk map 257 (step S58).

When the processing of the loop H has not been executed with respect to entire data of the temporary chunk, the CPU 24 executes the processing of the loop H, but when the processing of the loop H has been executed with respect to entire of the temporary chunk, the CPU 24 finishes the processing of the loop H.

On the other hand, when the CPU 24 determines not to divide the temporary chunk (step S56: NO), the CPU 24 takes no action and adopts the temporary chunk as an updated chunk (step S59) and writes an offset of the updated chunk in the chunk map 257 (step S60).

When the processing of the loop H is finished or when executing step S60, the CPU 24 executes the processing (steps S56 to S60) of the loop G when there is an unprocessed temporary chunk, and when the processing of the loop G has been performed with respect to all temporary chunks, the CPU 24 executes processing (steps S61 to S64) of a loop I for each updated chunk.

In the processing of the loop I, the CPU 24 creates a file (updated chunk file) of an updated chunk (step S61) and determines whether or not to execute encoding with respect to an updated chunk file that is a processing target (step S62). As a result, when the CPU 24 determines to execute encoding with respect to the updated chunk file that is a processing target (step S62: YES), the CPU 24 executes encoding processing with respect to the updated chunk file that is a processing target (step S63). On the other hand, when it is determined that encoding is not to be executed (step S62: NO), no action is taken with respect to the updated chunk file (step S64).

The CPU 24 executes the processing of the loop I with the chunk files of the respective updated chunks as targets, and once the processing of the loop I has been executed with the chunk files of all updated chunks as targets, the CPU 24 advances the processing to step S65 in FIG. 18.

In step S65, the CPU 24 determines whether or not the chunk coupled storage configuration to couple and store chunk files of chunks that constitute the file has been set in the cloud storage 30. As a result, when the chunk coupled storage configuration has not been set (step S65: NO), the CPU 24 executes processing when chunk individual storage is configured of steps S66 to S72 in which the chunks are individually stored. On the other hand, when the configuration to couple and store chunks has been set (step S65: YES), the CPU 24 executes processing when chunk coupled storage is configured of steps S73 to S84.

In the processing when chunk individual storage is configured, the CPU 24 executes processing (steps S66 and S67) of a loop J with respect to all updated chunk files.

In the processing of the loop J, the CPU 24 generates a file identifier with respect to an updated chunk file that is a processing target (step S66), and writes the generated file identifier into an entry corresponding to the updated chunk file in the chunk map 257A (step S67).

The CPU 24 executes the processing of the loop J with the respective updated chunk files as targets, and once the processing of the loop J has been executed with respect to all updated chunk files, the CPU 24 advances the processing to step S68.

In step S68, the CPU 24 determines whether or not a configuration to encode and store the chunk map 257A has been set. As a result, when the CPU 24 determines that a configuration to encode and store the chunk map 257A has been set (step S68: YES), the CPU 24 executes encoding processing for encoding the chunk map 257A (step S69) and advances the processing to step S71. On the other hand, when the CPU 24 determines that a configuration to encode and store the chunk map 257A has not been set (step S68: NO), the CPU 24 takes no action (step S70) and advances the processing to step S71.

In step S71, the CPU 24 generates a file identifier of the chunk map 257A based on the received file identifier.

Next, the CPU 24 transmits a storage request of all updated chunk files and the chunk map 257A to the cloud storage 30 and transmits all of the updated chunk files and the chunk map 257A (step S72), and ends the processing. Accordingly, the cloud storage 30 respectively separately stores all of the updated chunk files and the chunk map having been transmitted from the file storage 20 in the auxiliary storage unit 35. Such functions of processing in the cloud storage 30 in this case can be realized by basic functions included in general cloud storage.

On the other hand, in the processing when chunk coupled storage is configured, the CPU 24 executes processing (steps S73 and S74) of a loop K with each of all non-updated chunks as a target. In this case, a non-updated chunk refers to a chunk not including an updated portion among chunks constituting the file.

In the processing of the loop K, the CPU 24 identifies a post-processing start/end offset of a non-updated chunk from the chunk map 257B (step S73).

Next, the CPU 24 designates a file identifier of the updated file and the post-processing start/end offset and issues a copy request of the non-updated chunk (step S74).

The CPU 24 executes the processing of the loop K with non-updated chunks that have not been subjected to the processing of the loop K as targets, and once the processing of the loop K has been executed with respect to all non-updated chunks, the CPU 24 advances the processing to step S75.

In step S75, the CPU 24 couples files of continuous updated chunks. It should be noted that continuous updated chunk files need not be coupled.

Next, the CPU 24 transmits a storage request of all updated chunk files to the cloud storage 30 and transmits all of the updated chunk files (step S76). Accordingly, the updated chunk files are stored in the cloud storage 30.

Next, based on the chunk map 257B, the CPU 24 identifies a coupling order of non-updated chunk files and updated chunk files constituting the file (step S77), designates file identifiers of the chunk files (updated chunks and non-updated chunks) and a coupling order (for example, offsets) of the chunk files, and transmits a coupling request of all chunk files constituting the file to the cloud storage 30 (step S78). When there is no non-updated chunk file that constitutes the file, in step S77 and step S78, processing is performed using updated chunk files as targets by excluding non-updated chunk files. Accordingly, the cloud storage 30 stores a file in which chunk files after the update have been coupled in the auxiliary storage unit 35. Such functions of processing in the cloud storage 30 can be realized by basic functions included in general cloud storage.

Next, the CPU 24 writes a post-processing start/end offset in a file of each chunk file in the chunk map 257B (step S79).

Next, the CPU 24 determines whether or not a configuration to encode and store the chunk map 257B has been set (step S80). As a result, when the CPU 24 determines that a configuration to encode and store the chunk map 257B has been set (step S80: YES), the CPU 24 executes encoding processing with respect to the chunk map 257B (step S81) and advances the processing to step S83. On the other hand, when the CPU 24 determines that a configuration to encode and store the chunk map 257B has not been set (step S80: NO), the CPU 24 takes no action (step S82) and advances the processing to step S83.

In step S83, the CPU 24 generates a file identifier of the chunk map 257B based on the received file identifier.

Next, the CPU 24 transmits a storage request with respect to the chunk map 257B to the cloud storage 30 and transmits the chunk map 257B (step S84), and ends the processing. Accordingly, the cloud storage 30 stores the chunk map 257B with respect to a file after update having been transmitted from the file storage 20 in the auxiliary storage unit 35. Such functions of processing in the cloud storage 30 in this case can be realized by basic functions included in general cloud storage.

With the computer system 1 according to the embodiment described above, each divided chunk of a file can be stored in the cloud storage 30 after being encoded or without being encoded. In addition, when reading a portion of a file, even if at least one of the chunks of the file has been encoded, simply reading a chunk including a read portion from the cloud storage 30 enables necessary data to be obtained and a data amount of communication between the cloud storage 30 and the file storage 20 can be reduced. Furthermore, since the cloud storage 30 no longer needs to perform encoding processing and decoding processing, the cloud storage 30 need not be equipped with these functions. Moreover, functions of the cloud storage 30 necessary to respond to requests from the file storage 20 can be realized by basic functions included in general cloud storage, and since there are no constraints due to a specification of cloud storages, various cloud storages can be utilized as the cloud storage 30.

It is to be understood that the present invention is not limited to the embodiment described above and that various modifications can be made in the invention without departing from the spirit and scope thereof.

For example, while the file storage 20 is configured to be capable of switching between coupling and not coupling chunks constituting a file prior to storing the chunks in the cloud storage 30 in accordance with a configuration, the present invention is not limited thereto and the file storage 20 may be configured so as to be fixed to either coupling the chunks constituting a file prior to storing the chunks or storing the chunks without coupling the chunks.

In addition, while the partial update processing shown in FIGS. 10 and 13 in the embodiment described above is processing that is executed upon receiving an update with respect to data of a read portion from the computer 10 after reading the data from the cloud storage 30 based on a read command and transmitting the read portion to the computer 10 from the file storage 20, the present invention is not limited thereto and, for example, when a plurality of chunks (chunks that at least include a read portion) of a file corresponding to the read command are stored in the file storage 20, the partial update processing may be processing that is executed when reading a chunk including the read portion from the file storage 20, identifying the read portion from the chunk and transmitting the identified read portion to the computer 10, and receiving an update with respect to data of the transmitted read portion from the computer 10.

Furthermore, while compression processing and/or encryption processing has been mainly described as an example of encoding processing in the embodiment described above, encoding processing is not limited thereto and may include other kinds of encoding processing such as processing for calculating an error correction code (ECC) and adding the ECC to data and processing for calculating and adding an erasure correction code.

Moreover, the functions of the file storage 20 according to the embodiment described above may be incorporated into the computer 10 that is used by the user. When the functions of the file storage 20 are incorporated into the computer 10, the computer 10 corresponds to the file storage described in the claims. For example, when the functions of the file storage 20 are incorporated into the computer 10 that is used by the user, the computer system 1 need not include the file storage 20.

In addition, a part of or all of the processing steps performed by the CPU in the embodiment described above may be performed by a hardware circuit. Furthermore, the programs in the embodiment described above may be installed from a program source. The program source may be, for example, a program distribution server or a storage medium (for example, a portable storage medium) that is readable by a computer.

What is claimed is:

1. A file storage, which is coupled to a data storage, comprising:
   a processor; and
   a memory coupled to the processor, the memory storing instructions that when executed by the processor configure the processor to:
   manage a file,
   divide the file into a plurality of chunks, execute encoding processing on at least one of the chunks to obtain an encoded chunk, and store in the data storage the plurality of chunks of the file including the encoded chunk,
   acquire, upon receiving a read command of which a target is data of a part of a file stored in the data storage, a plurality of read target chunks that include data which is a target of the read command, from the data storage, execute, upon determining an encoded chunk is included in the read target chunk, decoding processing on the encoded chunk, identify data, which is a read target, from the read target chunk including the chunk having been subjected to decoding processing, and transfer the identified data to a command source of the read command, after acquiring the read target chunks, determine an update difference of the read target chunks and divide the plurality of read target chunks including the updated difference to create a plurality of new chunks and create files respectively corresponding to the new chunks, and store the new chunks in the data storage to replace the read target chunks.

2. The file storage according to claim 1, further comprising a storage unit configured to store encoding processing information relating to whether or not encoding processing is to be performed when storing each of the chunks in the data storage, wherein the processor is configured to determine execution of the encoding processing on the chunk to be stored in the data storage on the basis of the encoding processing information with respect to the chunk.

3. The file storage according to claim 1, wherein the processor is configured to divide the file into a plurality of chunks, store in a storage unit a chunk map indicating positional information that identifies a position of each of the divided chunks in the file, and identify, when receiving the read command, a read target chunk on the basis of the chunk map and acquire the identified read target chunk from the data storage.

4. The file storage according to claim 1, wherein the processor is configured to divide the file so that a size of each chunk is within a predetermined range.

5. The file storage according to claim 1, wherein the processor is configured to store in the data storage each of the chunks constituting the file independently.

6. The file storage according to claim 1, wherein the processor is configured to couple all of the chunks constituting the file and store the coupled chunks in the data storage.

7. The file storage according to claim 6, wherein the processor is configured to identify positional information after the encoding processing on all of the chunks constituting the file, store in a storage unit a chunk map including the positional information after the encoding processing on each of the chunks, and identify the read target chunk from the coupled chunks on the basis of the chunk map.

8. The file storage according to claim 1, wherein the encoding processing is at least one of compression processing for compressing data, encryption processing for encrypting data, processing for calculating and adding an error correction code, and processing for calculating and adding an erasure correction code.

9. A computer system, comprising:

a data storage configured to store data;

a file storage including a processor and a memory coupled to the processor, the memory storing instructions that when executed by the processor configure the processor to:

manage a file, divide the file into a plurality of chunks, execute encoding processing on at least one of the chunks to obtain an encoded chunk, and store in the data storage a plurality of chunks of the file including the encoded chunk, acquire, upon receiving a read command of which target is data of a part of a file stored in the data storage, a plurality of read target chunks that include data which is a target of the read command, from the data storage, execute, upon determining an encoded chunk is included in the read target chunk, decoding processing on the encoded chunk, identify data, which is a read target, from the read target chunk including the chunk having been subjected to decoding processing, and transfer the identified data to a command source of the read command, after acquiring the read target chunks, determine an update difference of the read target chunks and divide the plurality of read target chunks including the updated difference to create a plurality of new chunks and create files respectively corresponding to the new chunks, and store the new chunks in the data storage to replace the read target chunks.

10. The file storage according to claim 1, wherein at least two of the created plurality of new chunks include updated portions.

11. The computer system according to claim 1, wherein at least two of the created plurality of new chunks include updated portions.

* * * * *